(12) United States Patent
Nomura et al.

(10) Patent No.: US 10,156,767 B2
(45) Date of Patent: *Dec. 18, 2018

(54) LIGHT CONTROL FILM

(75) Inventors: Satoyuki Nomura, Tsukuba (JP); Yoshii Morishita, Tsukuba (JP); Tooru Tanaka, Tsukuba (JP); Shigeshi Ohno, Chikusei (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 496 days.

This patent is subject to a terminal disclaimer.

(21) Appl. No.: 13/059,555

(22) PCT Filed: Aug. 11, 2009

(86) PCT No.: PCT/JP2009/064192
§ 371 (c)(1),
(2), (4) Date: Feb. 17, 2011

(87) PCT Pub. No.: WO2010/021276
PCT Pub. Date: Feb. 25, 2010

(65) Prior Publication Data
US 2011/0143131 A1 Jun. 16, 2011

(30) Foreign Application Priority Data
Aug. 19, 2008 (JP) .............. P2008-210561

(51) Int. Cl.
*B32B 5/00* (2006.01)
*G02F 1/17* (2006.01)
*G02F 1/1334* (2006.01)

(52) U.S. Cl.
CPC ............ *G02F 1/172* (2013.01); *G02F 1/1334* (2013.01); *G02F 2202/28* (2013.01); *Y10T 428/265* (2015.01); *Y10T 428/31935* (2015.04)

(58) Field of Classification Search
CPC .. Y10T 428/1121; G02F 1/1334; G02F 1/172; G02F 1/167; C08G 18/3206
See application file for complete search history.

(56) References Cited

U.S. PATENT DOCUMENTS 1,955,923 A 4/1934 Land
1,963,496 A 6/1934 Land
(Continued)

FOREIGN PATENT DOCUMENTS

AU 2009283543 A1 2/2010
AU 2009283543 B2 2/2010
(Continued)

OTHER PUBLICATIONS

Pentaerythritol chemical structure (no date available).*
(Continued)

*Primary Examiner* — Samir Shah
(74) *Attorney, Agent, or Firm* — Fitch, Even, Tabin & Flannery, L.L.P.

(57) ABSTRACT

Disclosed is a light control film comprising: two transparent electroconductive resin substrates; and a light control layer sandwiched between the two transparent electroconductive resin substrates, the light control layer comprising: a resin matrix; and a light control suspension dispersed in the resin matrix, wherein at least one of the transparent electroconductive resin substrates has, on the light control layer side thereof, a primer layer, and the primer layer is made of a thin film comprising a material containing a (meth)acrylate having, in the molecule thereof, a hydroxyl group. Thus, it is possible to provide a light control film that improves the adhesion between a film matrix and a substrate, and that achieves a stable light control function.

23 Claims, 2 Drawing Sheets

(56) References Cited

U.S. PATENT DOCUMENTS

| | | | |
|---|---|---|---|
| 2,041,138 | A | 5/1936 | Land |
| 2,306,108 | A | 12/1942 | Land |
| 2,375,963 | A | 5/1945 | Thomas |
| 3,756,700 | A | 9/1973 | Saxe |
| 3,772,874 | A | 11/1973 | Lefkowitz |
| 3,912,365 | A | 10/1975 | Lowell |
| 4,078,856 | A | 3/1978 | Thompson et al. |
| 4,247,175 | A | 1/1981 | Saxe |
| 4,270,841 | A | 6/1981 | Saxe |
| 4,273,422 | A | 6/1981 | Saxe |
| 4,407,565 | A | 10/1983 | Saxe |
| 4,422,963 | A | 12/1983 | Thompson et al. |
| 5,463,491 | A * | 10/1995 | Check, III .............. 359/296 |
| 5,639,546 | A | 6/1997 | Bilkadi |
| 5,935,683 | A * | 8/1999 | Iiyama et al. .......... 428/141 |
| 6,271,956 | B1 | 8/2001 | Saxe |
| 6,368,680 | B1 | 4/2002 | Kubota et al. |
| 6,480,322 | B2 | 11/2002 | Engler et al. |
| 6,987,602 | B2 | 1/2006 | Saxe |
| 8,687,263 | B2 | 4/2014 | Nomura et al. |
| 2002/0131149 | A1 | 9/2002 | Engler et al. |
| 2003/0107797 | A1 | 6/2003 | Saxe |
| 2004/0115445 | A1* | 6/2004 | Sasaki et al. .......... 428/451 |
| 2004/0145562 | A1 | 7/2004 | Horikiri |
| 2006/0033981 | A1 | 2/2006 | Chaug |
| 2008/0280149 | A1 | 11/2008 | Higuchi et al. |
| 2009/0316254 | A1 | 12/2009 | Higashida et al. |
| 2010/0309544 | A1 | 12/2010 | Nomura et al. |
| 2011/0217546 | A1 | 9/2011 | Nomura et al. |

FOREIGN PATENT DOCUMENTS

| | | | |
|---|---|---|---|
| EP | 0081308 | A1 | 6/1983 |
| EP | 2124097 | A1 | 11/2009 |
| EP | 2239601 | A1 | 10/2010 |
| EP | 2322985 | | 5/2011 |
| GB | 433455 | | 8/1935 |
| JP | 58-116517 | | 7/1983 |
| JP | 64-51916 | | 3/1989 |
| JP | 04-335326 | | 11/1992 |
| JP | 05-27271 | | 2/1993 |
| JP | 05-273528 | | 10/1993 |
| JP | 06-118203 | | 4/1994 |
| JP | 7-219697 | | 8/1995 |
| JP | 7-296672 | | 11/1995 |
| JP | 09-001963 | | 1/1997 |
| JP | 2001-083554 | | 3/2001 |
| JP | 2002-80754 | | 3/2002 |
| JP | 2002-181923 | | 7/2002 |
| JP | 2002-189123 | | 7/2002 |
| JP | 2002189123 | * | 7/2002 |
| JP | 2002-287884 | | 10/2002 |
| JP | 2003-525468 | | 8/2003 |
| JP | 2005-32624 | A | 2/2005 |
| JP | 2005-533289 | | 11/2005 |
| JP | 2006-505013 | | 2/2006 |
| JP | 2006-124572 | | 5/2006 |
| JP | 2008-158043 | | 7/2008 |
| JP | 5104954 | B2 | 12/2012 |
| WO | WO 01/65299 | A1 | 9/2001 |
| WO | 2004/010206 | | 1/2004 |
| WO | WO 2004/042464 | A3 | 5/2004 |
| WO | 2004/088395 | | 10/2004 |
| WO | 2008075772 | A1 | 6/2008 |
| WO | WO 2009/093657 | A1 | 7/2009 |
| WO | 2010/021275 | A1 | 2/2010 |
| WO | 2010/021276 | | 2/2010 |

OTHER PUBLICATIONS

Machine translation of JP2002-189123 (2002).*
Product brochure AY 42-151 (Sep. 2007).*
Australian Search report in English dated Oct. 14, 2011.
Burridge, "Chemical Profile: Pentaerythirtol" ICIS Chemical Business, Nov. 12-18, 2007, p. 46.
Gierenz et al., "Adhesives and Adhesive Tapes" Wiley-VCH, 2001 ISBN 3527301100, pp. 12, 13 and 44.
English translation of International Preliminary Report dated Mar. 17, 2011.
Australian office action of Appln. No. 2009283544 dated Jul. 18, 2012 in English.
EP Search Report of Appln. No. 09808212.6 dated Dec. 29, 2011 in English.
Office Action of EP Appln. No. 09808212.6-1904 in counterpart dated Jul. 15, 2015 in English.
Communication dated Jun. 15, 2012 for European Patent Application No. 10741231.4; 6 pages.
Communication dated Feb. 14, 2013 in connection with European Application No. 10 741 231.4-1904; 3 pages.
Communication dated Jul. 28, 2015 for Japanese Application No. 2014-193765 with English translation.
Communication dated May 27, 2014 in connection with Japanese Patent Application No. 2010-550521; 2 pages.
Communication dated Oct. 1, 2013 in connection with Japanese Patent Application No. 2010-550521; 2 pages.
Communication dated Sep. 2, 2013 in connection with Australian Application No. 2010214432; 4 pages.
Final Office Action in U.S. Appl. No. 13/148,956 dated Jul. 3, 2017.
International Preliminary Report on Patentability dated Sep. 22, 2011.
Decision of Refusal dated Feb. 23, 2016 for Japanese Application No. 2014-193765 with English translation.
English translation of International Preliminary Examination Report on Patentability dated Sep. 22, 2011.
EP Search report of Application No. 09808211.8 dated Dec. 29, 2011.
Final Office Action in U.S. Appl. No. 13/059,542 dated Jan. 24, 2014.
Final Office Action in U.S. Appl. No. 13/059,542 dated Nov. 20, 2012.
Final Office Action in U.S. Appl. No. 13/148,956 dated Apr. 22, 2013.
Final Office Action in U.S. Appl. No. 13/146,956 dated Mar. 16, 2015.
Final Office Action in U.S. Appl. No. 14/166,923 dated Apr. 18, 2017.
Final Office Action in U.S. Appl. No. 14/166,923 dated Oct. 16, 2015.
Japanese Office Action of Application No. 2010-550520 dated Jan. 7, 2014 with English translation.
Japanese Office Action of Application No. 2010-550520 dated May 7, 2013 with English translation.
Japanese Office Action of Application No. 2014-078680 dated Dec. 16, 2014 with English translation.
Machine translation of JP06-118203 (1994).
Non-Final Office Action in U.S. Appl. No, 13/059,542 dated Jun. 27, 2013.
Non-Final Office Action in U.S. Appl. No, 13/059,542 dated May 22, 2012.
Non-Final Office Action in U.S. Appl. No. 13/148,956 dated Dec. 13, 2016.
Non-Final Office Action in U.S. Appl. No. 13/148,956 dated Jul. 13, 2012.
Non-Final Office Action in U.S. Appl. No. 13/148,956 dated Jun. 30, 2014.
Non-Final Office Action in U.S. Appl. No. 14/166,923 dated Aug. 4. 2016.
Non-Final Office Action in U.S. Appl. No. 14/166,923 dated Dec. 23, 2014.
Office Action dated Sep. 27, 2016 for Japanese Application No. 2015-216497 with English translation.
Office Action of Japanese Application No. 2014-078680 dated Aug. 4, 2015 with English translation.
The Extended European Search Report for European Patent Application No. 10741230.6-1568 dated Nov. 8, 2017.

(56) References Cited

OTHER PUBLICATIONS

Non-Final Office Action in U.S. Appl. No. 13/148,962 dated Feb. 27, 2013.

* cited by examiner (a)

(b)

LIGHT CONTROL FILM

TECHNICAL FIELD

The present invention relates to a light control film having a light control function.

BACKGROUND ART

Light control glass containing a light control suspension was first invented by Edwin Land. The form thereof has a structure wherein a light control suspension in a liquid state is injected between two transparent electroconductive substrates having a narrow gap (see, for example, Patent Documents 1 and 2). According to Edwin Land's invention, in the state that no electric field is applied to the liquid light control suspension, which is injected between the two transparent electroconductive substrates, the great majority of light radiated thereinto is reflected, scattered or absorbed on/in the light control particles dispersed in the suspension by Brownian movement of the light control particles. Only a very small portion thereof is transmitted therethrough.

In other words, the degree of the transmission, reflection, scattering or absorption is decided in accordance with the shape, nature and concentration of the light control particles dispersed in the light control suspension, and the energy quantity of the radiated light. When an electric field is applied to a light control window wherein light control glass having the above-mentioned structure is used, the field is passed through the transparent electroconductive substrates so that an electric field is formed in the light control suspension. The light control particles, which show a light control function, are polarized so that the particles are arranged in parallel to the electric field. As a result, light is transmitted between the light control particles. Finally, the light control glass turns transparent. However, such an initial light control device has not easily been put into practice use because of the aggregation of the light control particles in the light control suspension, the sedimentation based on the weight of the particles themselves, a change in the color phase on the basis of heat, a change in the optical density, a deterioration based on the radiation of ultraviolet rays, difficulties in the maintenance of the interval between the substrates and in the injection of the light control suspension into the interval, and others.

Rober L. Saxe, F. C. Lowell or R. I. Thompson discloses a light control window using light control glass which compensates for problems of initial light control windows, that is, the aggregation and the sedimentation of light control particles, a change in the optical density, and others (see, for example, Patent Documents 3 to 9). According to these patents and others, use is made of a liquid-state light control suspension composed of light control crystal particles in a needle form, a suspending agent for dispersing the crystal particles, a dispersion adjustor, a stabilizer and others to make the density of the light control particles substantially equal to that of the suspending agent, whereby the sedimentation of the light control particles is prevented while the addition of the dispersion adjustor makes the dispersibility of the light control particles high. In this way, the aggregation of the light control particles is prevented so that the initial problems are solved. However, the light control glass has a structure wherein a light control suspension in a liquid state is sealed into a gap between two transparent electroconductive substrates, similarly to any conventional light control glass; thus, when a large-size product is produced, it is difficult to seal the suspension evenly into the gap between the two transparent electroconductive substrates, so that there remains a problem that a difference in hydraulic pressure between the upper and lower regions of the product easily causes an expansion phenomenon of the lower region. Additionally, in accordance with the external environment, for example, the pressure of wind, the interval between the substrates is changed, so that the following problem is caused: the optical density is changed so that the color phase becomes uneven; or a sealing member in the surroundings, for storing liquid between the transparent electroconductive substrates is broken so that the light control material leaks. Moreover, the response time becomes uneven by a deterioration based on ultraviolet rays, or a drop in the voltage between the circumferential region of the transparent electroconductive substrates and the center region thereof.

As a method for improving the above, suggested is a method of mixing a liquid light control suspension with a solution of a curable polymeric resin, and using a phase-separation method using polymerization, a phase-separation method using solvent-volatilization, a phase-separation method depending on temperature, or some other method to produce a film (see, for example, Patent Document 10). However, about the polymeric resin, which is to be cured to become a film matrix, the molecule thereof is not designed, considering the adhesiveness to a transparent electroconductive substrate. Thus, poor is the adhesiveness between the film matrix and a substrate, such as a PET film having a surface on which a electroconductive thin film made of ITO or the like is formed, so that there remains a problem that these are very easily peeled from each other.

PRIOR ART LITERATURES

Patent Literatures

Patent Literature 1: U.S. Pat. No. 1,955,923
Patent Literature 2: U.S. Pat. No. 1,963,496
Patent Literature 3: U.S. Pat. No. 3,756,700
Patent Literature 4: U.S. Pat. No. 4,247,175
Patent Literature 5: U.S. Pat. No. 4,273,422
Patent Literature 6: U.S. Pat. No. 4,407,565
Patent Literature 7: U.S. Pat. No. 4,422,963
Patent Literature 8: U.S. Pat. No. 3,912,365
Patent Literature 9: U.S. Pat. No. 4,078,856
Patent Literature 10: JP-A No. 2002-189123

DISCLOSURE OF THE INVENTION

Technical Problem

An object of the present invention is to provide a light control film wherein the adhesiveness between a film matrix and a substrate is improved to exhibit a stable light control function.

Solution to Problem

The inventors of the present invention have made eager investigations so as to find out that the above-mentioned problems can be solved by laying a specified primer layer on the light-control-layer-side surface of at least one of the transparent electroconductive resin substrates.

Thus, the present invention relates to a light control film, comprising: two transparent electroconductive resin substrates; and a light control layer sandwiched between the two transparent electroconductive resin substrates, the light control layer comprising: a resin matrix; and a light control suspension dispersed in the resin matrix, wherein at least one of the transparent electroconductive resin substrates has, on the light control layer side thereof, a primer layer, and the primer layer is made of a thin film comprising a material containing a (meth)acrylate having, in the molecule thereof, a hydroxyl group. It is preferred that this hydroxyl group is an alcoholic hydroxyl group.

More preferably, the (meth)acrylate, which has in the molecule thereof a hydroxyl group, is an acrylate having a pentaerythritol skeleton.

The primer layer may further contain oxide fine particles. It is also preferred that the (meth)acrylate having in the molecule thereof a hydroxyl group, is a thermally-cured or optically-cured acrylate.

In the present invention, the film thickness of the primer layer is preferably 500 nm or less.

Effects of the Invention

The light control film of the present invention is high in the adhesiveness between the light control layer and the transparent electroconductive resin substrates, so that the film can exhibit a stable light control function.

The disclosure of the present application is related to the subject matters described in Japanese Patent Application No. 2008-210561 filed on Aug. 19, 2008, and the contents disclosed therein are incorporated herein by reference.

BEST MODE FOR CARRYING OUT THE INVENTION

Figure 1:
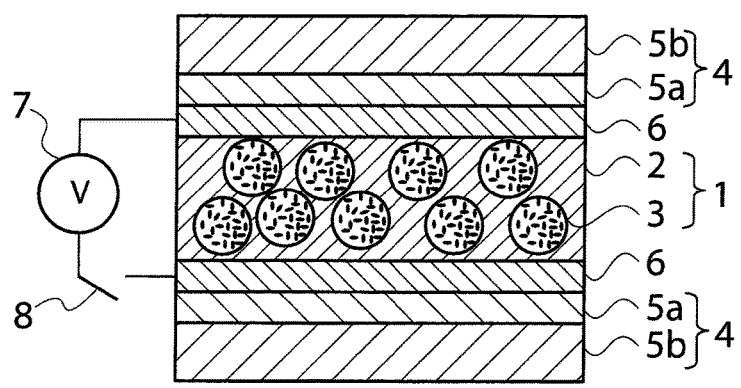
FIG. 1 is a schematic view of a sectional structure of an aspect of a light control film of the present invention.

A light control film of the present invention is a light control film wherein a light control layer comprising: a resin matrix; and a light control suspension dispersed in the resin matrix, is sandwiched between two transparent electroconductive resin substrates, wherein a specified primer layer is laid on a surface of at least one of the transparent electroconductive resin substrates which is a surface contacting the light control layer.

The light control layer can be generally formed by use of a light control material. The light control material contains the following: a polymeric medium that is irradiated with an energy ray to be cured, as a resin matrix; and a light control suspension wherein light control particles are dispersed in a dispersing medium in the state that the particles can flow. It is preferred that the dispersing medium in the light control suspension can undergo phase separation from the polymeric medium and from a cured product thereof. The light control film of the present invention is obtained by using the light control material and sandwiching the light control layer, wherein the light control suspension is dispersed in the resin matrix made of the polymeric medium, between the two transparent electroconductive resin substrates which each have a surface subjected to primer treatment and contacting the light control layer, between the two transparent electroconductive resin substrates only one of which has a surface subjected to primer treatment and contacting the light control layer, or between others. In other words, in the light control layer of the light control film of the present invention, the light control suspension, which is a liquid state, is dispersed in the form of fine droplets in the resin matrix, which is a solid state, obtained by curing the polymeric medium. The light control particles contained in the light control suspension are preferably in the form of rods or needles.

When an electric field is applied to the light control film, the light control particles having an electric dipolar moment, which are floated and dispersed in the droplets of the light control suspension dispersed in the resin matrix, are arranged in parallel to the electric field, whereby the droplets are converted to the state of being transparent to incident light, so that the film transmits the incident light in the state that the light is hardly scattered in accordance with the viewing angle or the transparency is hardly declined. In the present invention, a light control layer is laid onto a specified primer layer to form a film, thereby solving problems of any conventional light control film, that is, problems that the adhesiveness between its light control layer and its transparent electroconductive resin substrates is weak so that the light control layer is peeled from the transparent electroconductive resin substrates in the production steps, a working step after the production of the film, or some other step.

In the present invention, about the (meth)acrylate having in the molecule thereof a hydroxyl group, as a material for forming the primer layer, it is preferred that the hydroxyl group is an alcoholic hydroxyl group. The (meth)acrylate having in the molecule thereof a hydroxyl group, is more preferably an acrylate containing a pentaerythritol skeleton.

Hereinafter, the structure of each of the individual layers, and the light control film will be described.

<Primer Layer>

First, a description will be made about the (meth)acrylate having in the molecule thereof a hydroxyl group and is used in the primer layer in the present invention. Examples of the (meth)acrylate having in the molecule thereof a hydroxyl group, include compounds represented by formula (1) to formula (8) illustrated below.

The (meth)acrylate having a hydroxyl group, is preferably a (meth)acrylate having a hydroxyl group and a pentaerythritol skeleton. In the "(meth)acrylate having a hydroxyl group and a pentaerythritol skeleton", all the hydroxyl groups of the pentaerythritol may be substituted as far as the hydroxyl group is present inside the (meth)acrylate molecule. The "(meth)acrylate" is preferably a (meth)acrylate wherein at least one of the hydroxyl groups of pentaerythritol is unsubstituted.

[Formula 1]

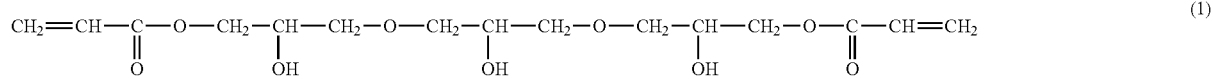

(1)

[Formula 2]

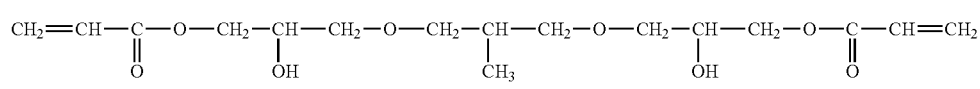

[Formula 3]

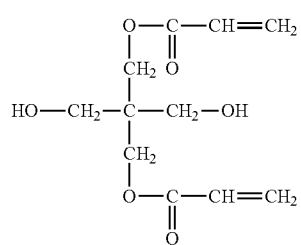

[Formula 4]

(4)

[Formula 5]

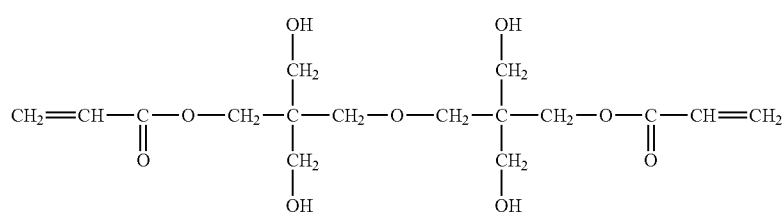

[Formula 6]

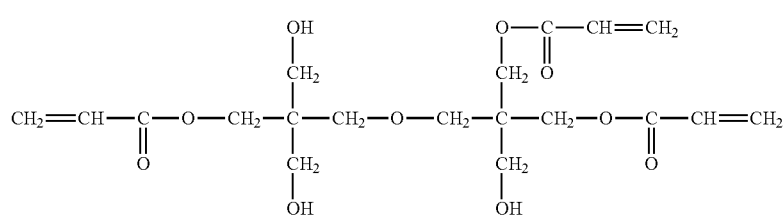

[Formula 7]

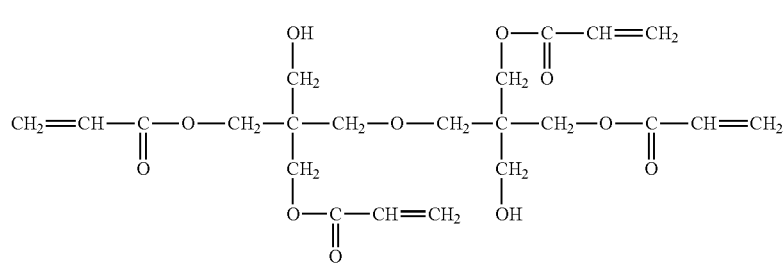

[Formula 8]

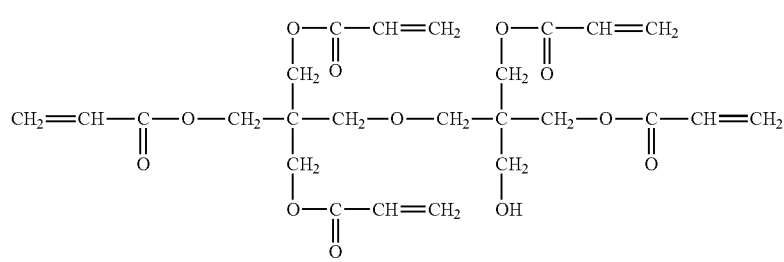

As a material for forming the primer layer, any (meth) acrylate described below may be used besides the (meth) acrylate having in the molecule thereof a hydroxyl group and the more preferably used (meth)acrylate having a hydroxyl group and a pentaerythritol skeleton. The usable (meth)acrylate is, for example, a compound as described in the following, but is not limited thereto in the present invention: an acrylic acid ester such as sorbitol tetraacrylate, 2-hydroxy-3-acryloyloxypropyl methacrylate, 2-hydroxy-3-phenoxypropyl acrylate, 2-acryloyloxy-2-hydroxyethylphthalic acid, a methacrylic acid adduct of ethylene glycol diglycidyl ether, an acrylic acid adduct of tripropylene glycol diglycidyl ether, a methacrylic acid or acrylic acid adduct of bisphenol A diglycidyl ether, a methacrylic acid or acrylic acid adduct of diglycidyl ether to which 2 moles of bisphenol A propylene oxide is added, 2-hydroxyethyl methacrylate, 2-hydroxypropyl methacrylate, 2-hydroxyethyl acrylate, 2-hydroxypropyl acrylate, 2-hydroxybutyl methacrylate, or sorbitol pentaacrylate; a methacrylic acid ester such as pentaerythritol dimethacrylate, pentaerythritol trimethacrylate, sorbitol tetramethacrylate, dipentaerythritol dimethacrylate, dipentaerythritol trimethacrylate, or dipentaerythritol tetramethacrylate; a crotonic acid ester such as pentaerythritol dicrotonate, or pentaerythritol tricrotonate; or an itaconic acid ester, such as pentaerythritol diitaconate, pentaerythritol triitaconate, dipentaerythritol triitaconate, or dipentaerythritol pentaitaconate.

As a material for forming the primer layer, the following may be further contained: a urethane acrylate containing a pentaerythritol skeleton, or a urethane acrylate containing both of a pentaerythritol skeleton and an IPDI (3-isocyanatomethyl-3,5,5-trimethylcyclohexylisocyanate) skeleton. Specific examples thereof include compounds represented by the following formula (9) to formula (15):

[Formula 9]

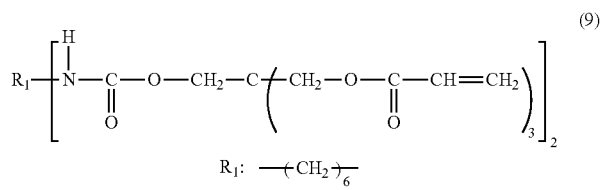

(9)

[Formula 10]

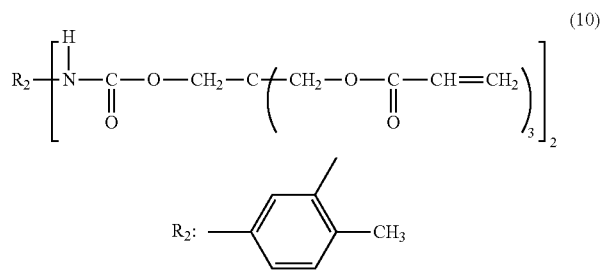

(10)

[Formula 11]

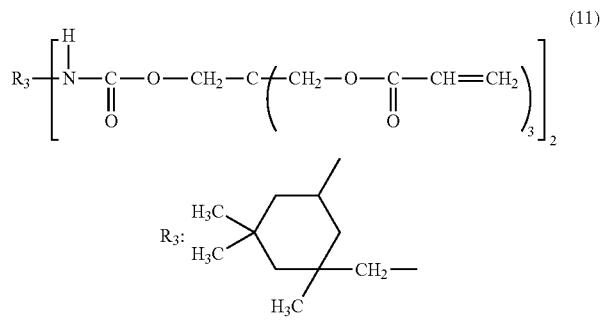

(11)

[Formula 12]

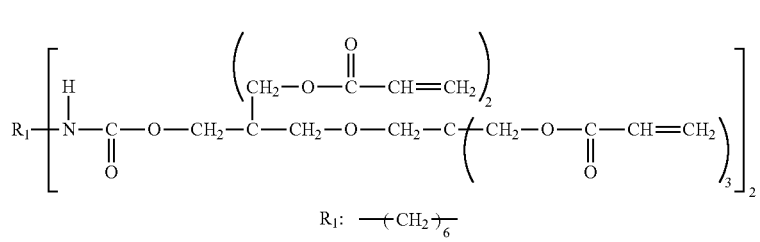

(12)

[Formula 13]

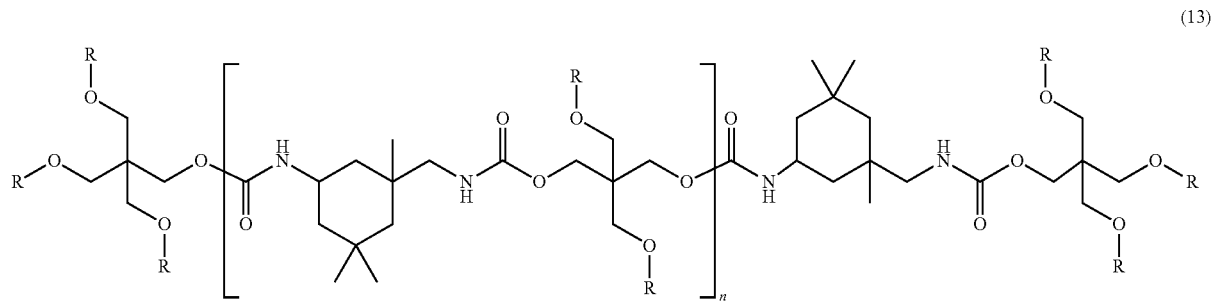

(13)

[Formula 14]

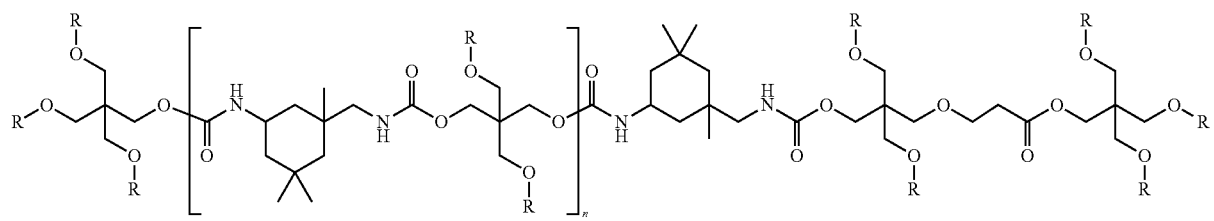

(14)

[Formula 15]

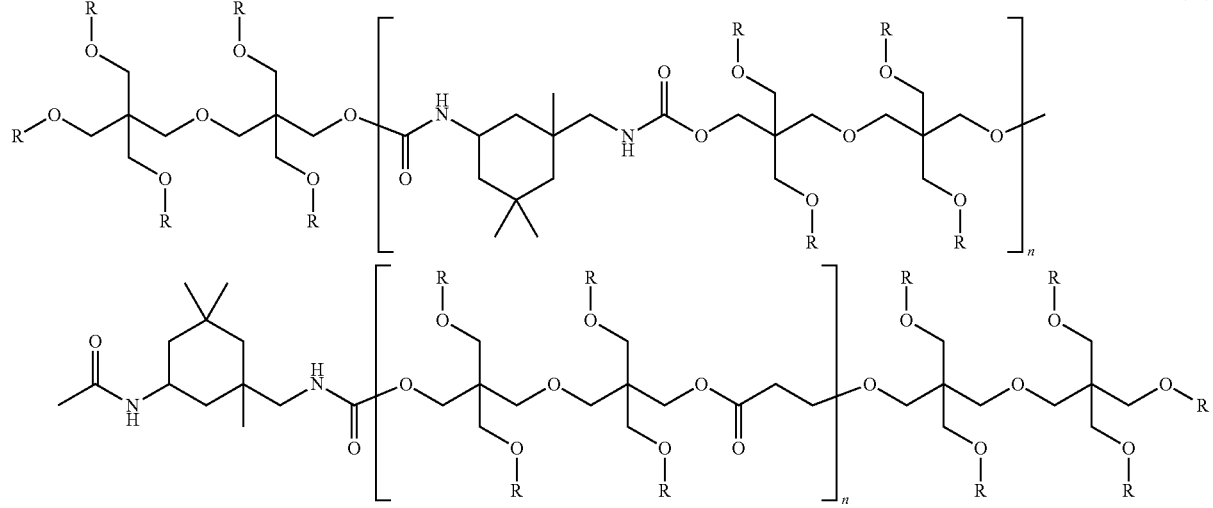

(15)

In each of the formula (13) to formula (15), R's may be the same or different, and are each a group illustrated below. At least one of R's is preferably H.

[Formula 16]

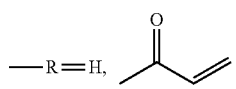

In the "urethane acrylate containing a pentaerythritol skeleton" as the material used together to form the primer layer, the "pentaerythritol skeleton" has a structure represented by the following formula (a):

[Formula 17]

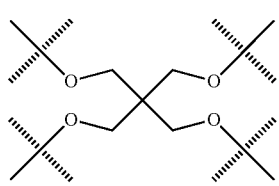

(a)

Specifically, the "urethane acrylate containing a pentaerythritol skeleton" has a structure wherein at least one hydrogen in the hydroxyl groups of pentaerythritol present in the molecule of the urethane acrylate is substituted with a carbamoyl group and further at least one of the hydroxyl groups is esterified with (meth)acrylic acid. At this time, the carbamoyl group and/or (meth)acrylic acid may (each) have a substituent. The hydroxyl group substituted with the carbamoyl group and the hydroxyl group esterified with (meth)acrylic acid do not need to be hydroxyl groups bonded to the same pentaerythritol skeleton represented by the formula (a).

It is also preferred that the urethane acrylate containing a pentaerythritol skeleton in the present invention has, as the pentaerythritol skeleton thereof, dipentaerythritol wherein two are linked to each other through oxygen. In this case also, at least one hydrogen of the hydroxyl groups of the pentaerythritol is substituted with a carbamoyl group and further at least one of the hydroxyl groups is esterified with (meth)acrylic acid. At this time, the carbamoyl group and/or (meth)acrylic acid may (each) have a substituent.

The "IPDI (3-isocyanatomethyl-3,5,5-trimethylcyclohexylisocyanate) skeleton" denotes a structure represented by the following formula (b):

[Formula 18]

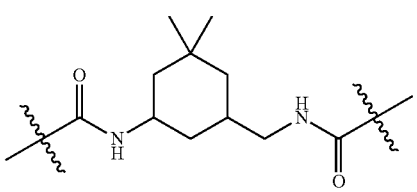

(b)

It is preferred that the primer layer further contains oxide fine particles.

Examples of the oxide that may be contained in the primer layer include $SiO_2$, ITO, $ZrO_2$, $TiO_2$, $Bi_2O_3$, $Al_2O_3$, $Y_2O_3$, $CeO_2$, ZnO, CuO, $Sn_2O$, and cobalt blue. The oxide is more preferably any one of $SiO_2$, ITO and $ZrO_2$, or a mixture thereof.

When the oxide fine particles are added, as a filler, to the primer layer, the primer layer can gain a high hardness so as to produce an effect that when the light control film is peeled to take out electrodes, an underlying transparent electroconductive film is not easily injured or scratched.

The addition of the oxide fine particles to the primer layer may make it possible to adjust the surface energy of the primer layer to produce an adhesiveness-improving effect.

The particle diameter of the oxide fine particles is preferably 50 nm or less from the viewpoint of a restraint of a rise in the haze of the light control film.

The average particle diameter in the present invention is the particle diameter calculated out by use of the following equation based on the specific surface area obtained by making a measurement with a surface area measuring device according to the BET method:

Average particle diameter (nm)=6000/(Density [g/cm$^3$]×Specific surface area [m$^2$/g])

It is advisable that about the metal oxide fine particles having an average particle diameter in the above-mentioned range, an appropriate product is selected from commercially available products.

The content by percentage of the oxide fine particles in the primer layer is preferably 30% or less by mass of the whole of the materials of the primer layer from the viewpoint of a restraint of a rise in the haze of the light control film.

The (meth)acrylate having in the molecule thereof a hydroxyl group used in the present invention, can be synthesized by a known synthesis process. In a case where the ester is, for example, an epoxy ester, the ester can be obtained by causing an epoxy compound and (meth)acrylic acid to react with each other in an inert gas in the presence of an esterifying catalyst and a polymerization inhibitor.

Examples of the inert gas include nitrogen, helium, argon, and carbon dioxide. These may be used alone or in combination.

The esterifying catalyst may be, for example, a compound having tertiary nitrogen, such as triethylamine, a pyridine derivative or an imidazole derivative, a phosphorus compound such as trimethylphosphine or triphenylphosphine, or an amine salt such as tetramethylammonium chloride or triethylamine. The addition amount thereof is from 0.000001 to 20% by mass, preferably from 0.001 to 1% by mass.

The polymerization inhibitor may be a polymerization inhibitor that is itself known, such as hydroquinone or tert-butylhydroquinone. The use amount thereof is selected from the range of 0.000001 to 0.1% by mass.

Examples of the epoxy ester include 2-hydroxy-3-phenoxypropyl acrylate (trade name: ARONIX M-5700, manufactured by Toagosei Co., Ltd., or trade name: EPOXY ESTER M-600A, manufactured by Kyoeisha Chemical Co., Ltd.), 2-hydroxy-3-acryloyloxypropyl methacrylate (trade name: LIGHT ESTER G-201P, manufactured by Kyoeisha Chemical Co., Ltd.), and a glycerin diglycidyl ether acrylic-acid-adduct (trade name: EPOXY ESTER 80MFA, manufactured by Kyoeisha Chemical Co., Ltd.).

In the case of the (meth)acrylate having a hydroxyl group and a pentaerythritol skeleton, this ester can be obtained by causing pentaerythritol, dipentaerythritol or the like to react with acrylic acid or methacrylic acid in the air in the presence of an esterifying catalyst and a polymerization inhibitor. The method for reaction for adding acrylic acid or methacrylic acid to pentaerythritol or dipentaerythritol may be a known method described in JP-B No. 5-86972, JP-A No. 63-68642, and others.

Specific examples of a commercially available product containing the (meth)acrylate having a hydroxyl group and a pentaerythritol skeleton include AY42-151 (a mixture of a dipentaerythritol type acrylate, a methacrylic acid monomer and a siloxane compound, containing $SiO_2$ fine particles as a filler, and manufactured by Dow Corning Toray Co., Ltd.), and ARONIX M-305 (a mixture of pentaerythritol acrylate and pentaerythritol tetraacrylate, containing no filler and manufactured by Toagosei Co., Ltd.), and UVHC 7000 (an IPDI-skeleton-containing pentaerythritol type urethane acrylate, containing no filler and manufactured by Momentive Performance Materials Japan LLC).

The urethane acrylate containing pentaerythritol skeleton can be synthesized by a known method. For example, urethane acrylate is generally obtained by causing hydroxyl groups of a polyol compound, a polyisocyanate compound or the like to react with a hydroxyl-group-containing (meth)acrylate to react with each other by a known method; therefore, in the same way, the urethane acrylate containing pentaerythritol skeleton can be produced by, for example, any one of the following production methods 1 to 4:

(Production method 1): a method of charging a polyol compound, a polyisocyanate compound, and a pentaerythritol-skeleton-containing (meth)acrylate at a time so as to be caused to react with each other;

(Production method 2): a method of causing a polyol compound and a polyisocyanate compound to react with each other, and next causing the resultant to react with a pentaerythritol-skeleton-containing (meth)acrylate;

(Production method 3): a method of causing a polyisocyanate compound and a pentaerythritol-skeleton-containing (meth)acrylate to react with each other, and next causing the resultant to react with a polyol compound; and (Production method 4): a method of causing a polyisocyanate compound and a pentaerythritol-skeleton-containing (meth)acrylate to react with each other, next causing the resultant to react with a polyol compound, and finally causing the resultant to react also with the pentaerythritol-skeleton-containing (meth)acrylate.

In these reactions, a catalyst may be used. For example, a tin based catalyst such as dibutyltin laurate, or a tertiary amine catalyst is used.

Examples of the pentaerythritol-skeleton-containing (meth)acrylate used in the production methods 1 to 4 include pentaerythritol diacrylate, pentaerythritol triacrylate, dipentaerythritol pentaacrylate, dipentaerythritol tetraacrylate, and other hydroxyl-group-containing (meth)acrylates.

Examples of the polyisocyanate compound used in the production methods 1 to 4 include 2,4-tolylenediisocyanate, 2,6-tolylenediisocyanate, 1,3-xylylenediisocyanate, 1,4-xylylenediisocyanate, 1,5-naphthalenediisocyanate, m-phenylenediisocyanate, p-phenylenediisocyanate, 3,3'-dimethyl-4,4'-diphenylmethanediisocyanate, 4,4'-diphenylmethanediisocyanate, 3,3'-diphenylmethanediisocyanate, 4,4'-biphenylenediisocyanate, 1,6-hexanediisocyanate, isophoronediisocyanate (3-isocyanatomethyl-3,5,5-trimethylcyclohexylisocyanate), methylenebis(4-cyclohexylisocyanate), 2,2,4-trimethylhexamethylenediisocyanate, 1,4-hexamethylenediisocyanate, bis(2-isocyanatoethyl) fumarate, 6-isopropyl-1,3-phenyldiisocyanate, 4-diphenylpropanediisocyanate, and lysinediisocyanate.

The urethane acrylate containing a pentaerythritol skeleton may be a commercially available product containing a urethane acrylate containing pentaerythritol Skelton. Examples thereof include UA-306H, UA-306I, UA-306T, and UA-510 (each manufactured by Kyoeisha Chemical Co., Ltd.).

The urethane acrylate containing both of a pentaerythritol skeleton and an IPDI skeleton can be obtained by use of isophoronediisocyanate as the polyisocyanate compound in any one of the production methods 1 to 4.

It is preferred that a thermopolymerization initiator or a photopolymerization initiator is used to cure the (meth) acrylate having in the molecule thereof a hydroxyl group, used for the formation of the primer layer, optionally together with the following compound, thereby forming a thin film: a (meth)acrylate other than it, a urethane acrylate containing a pentaerythritol skeleton, or a urethane acrylate containing both of an IPDI (3-isocyanatomethyl-3,5,5-trimethylcyclohexylisocyanate) skeleton, and a pentaerythritol skeleton. The method for the thermal curing and the method for the photocuring are not particularly limited, and may each be an ordinary curing method.

The thermopolymerization initiator used in the present invention may be any agent that is decomposed by heat, so as to generate radicals, thereby making it possible to start the polymerization of a polymerizable compound. Radical initiators useful therefor are known initiators, examples thereof include organic peroxides, and azonitriles. However, the initiator is not limited thereto. Examples of the organic peroxides include alkyl peroxides, aryl peroxides, acyl peroxides, aroyl peroxides, ketone peroxides, azonitriles, peroxycarbonate, and peroxycarboxylate.

Examples of the alkyl peroxides include diisopropyl peroxide, di-tert-butyl peroxide, di-tert-amyl peroxide, tert-butylperoxy-2-ethyl hexanoate, tert-amylperoxy-2-ethyl hexanoate, and tert-butyl hydroperoxide.

Examples of the aryl peroxide include dicumyl peroxide, and cumyl peroxide. Examples of the acyl peroxides include dilauroyl peroxide.

Examples of the aroyl peroxides include dibenzoyl peroxide.

Examples of the ketone peroxides include methyl ethyl ketone peroxide, and cyclohexanone peroxide.

Examples of the azonitriles include azobisisobutyronitrile, and azobisisopropylnitrile.

Examples of commercially available products of the thermopolymerization initiator include PEROYL IB, PERCUMYL ND, PEROYL NPP, PEROYL IPP, PEROYL SBP, PEROCTA ND, PEROYL TCP, PERROPYL OPP, PERHEXYL ND, PERBUTYL ND, PERBUTYL NHP, PERHEXYL PV, PERBUYTL PV, PEROYL 355, PEROYL L, PEROCTA O, PEROYL SA, PERHEXA 250, PERHEXYL O, NYPER PMB, PERBUTYL O, NYPER BMT, NYPER BW, PERHEXA MC and PERHEXA TMH (each manufactured by NOF Corp.); and azo compounds, in particular, 2,2'-azobis(4-methoxy-2,4-dimethylvaleronitrile), 2,2'-azobis(2,4-dimethylvaleronitrile), 2,2'-azobis(2-methyl-butyronitrile), 2,2'-azobis(N-(2-propenyl)-2-methylpropionamide) and/or dimethyl 2,2'-azobis(2-methylpropionate), and dimethyl 2,2'-azoisobutyrate.

The photopolymerization initiator may be any agent that is dissolved by irradiation with light, so as to generate radicals, thereby making it possible to start the polymerization of a polymerizable compound. Examples thereof include acetophenone, acetophenone benzyl ketal, 1-hydroxycyclohexyl phenyl ketone, 2,2-dimethoxy-2-2-phenylacetophenone, xanthone, fluorenone, benzaldehyde, anthraquinone, triphenylamine, carbazole, 3-methylacetophenone, 4-chlorobenzophenone, 4,4'-dimethoxybenzophenone, 4,4'-diaminobenzophenone, Michler's ketones, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethylbenzoyldiphenylphosphine oxide, and bis-(2,6-dimethoxybenzoyl)-2,4,4-trimethylpentylphosphine oxide. However, the initiator is not limited thereto.

Examples of commercially available products of the photopolymerization initiator include IRGACURE 651, IRGACURE 184, IRGACURE 500, IRGACURE 2959, IRGACURE 127, IRGACURE 754, IRGACURE 907, IRGACURE 369, IRGACURE 379, IRGACURE 379EG, IRGACURE 1300, IRGACURE 819, IRGACURE 819DW, IRGACURE 1800, IRGACURE 1870, IRGACURE 784, IRGACURE OXE01, IRGACURE OXE02, IRGACURE 250, IRGACURE PAG103, IRGACURE PAG108, IRGACURE PAG121, IRGACURE PAG203, DAROCURE 1173, DAROCURE MBF, DAROCURE TPO, DAROCURE 4265, DAROCURE EDB, and DAROCURE EHA (each manufactured by Ciba Japan K.K.); C0014, B1225, D1640, D2375, D2963, M1245, B0103, C1105, C0292, E0063, P0211, I0678, P1410, P1377, M1209, F0362, B0139, B1275, B0481, D1621, B1267, B1164, C0136, C1485, I0591, F0021, A0061, B0050, B0221, B0079, B0222, B1019, B1015, B0942, B0869, B0083, B2380, B2381, D1801, D3358, D2248, D2238, D2253, B1231, M0792, A1028, B0486, T0157, T2041, T2042, T1188 and T1608 (each manufactured by Tokyo Chemical Industry Co., Ltd.).

In the present invention, the film thickness of the primer layer is preferably 500 nm or less, more preferably from 1 to 500 nm. The thickness is preferably from 10 to 500 nm, more preferably from 10 to 500 nm, even more preferably from 10 to 100 nm. If the film thickness is less than 1 nm, the film tends to be unable to express a sufficient bonding force. If the film thickness is more than 500 nm, the tackiness of the primer layer becomes strong so that the following inconvenience tends to be easily caused: after the primer layer is applied onto a transparent electroconductive resin substrate film and the resultant is wound around a roll, the primer layer is transferred onto the rear surface of the transparent electroconductive resin substrate film; or when a light control film is produced, the positioning of the substrate film to be laminated onto the primer layer becomes difficult.

The film thickness of the primer layer can be measured by reflectometry of ultraviolet rays or visible rays, X-ray reflectivity analysis, ellipsometry or the like.

<Light Control Layer>

The light control layer in the present invention includes a light control material containing a resin matrix and a light control suspension dispersed in the resin matrix. The resin matrix includes a polymeric medium, and the light control suspension is a material wherein light control particles are dispersed in a dispersing medium in the state that the particles can flow. As the polymeric medium and the dispersing medium (dispersing medium in the light control suspension), use is made of a polymeric medium and a dispersing medium that make the following possible: when the polymeric medium and a cured product therefrom can undergo phase-separation from the dispersing medium at least when these materials have been formed into a film. It is preferred to use a combination of a polymeric medium and a dispersing medium that are incompatible with each other or are partially compatible with each other.

The polymeric medium used in the present invention may be a composition which contains (A) a resin with a substituent having an ethylenically unsaturated bond, and (B) a photopolymerization initiator, and the polymeric medium is irradiated with an energy beam such as ultraviolet rays, visible rays, an electron beam, thereby being cured. The resin (A), which has an ethylenically unsaturated bond, is preferably a silicone resin, an acrylic resin, a polyester resin or some other from the viewpoint of easiness in the synthesis thereof, the light control performances and endurance thereof, and others. It is preferred from the viewpoint of the light control performances and the endurance that the preferred resin has, as a substituent thereof, an alkyl group such as a methyl, ethyl, propyl, isopropyl, butyl, isobutyl, tert-butyl, amyl, isoamyl, hexyl or cyclohexyl group, or an aryl group such as a phenyl or naphthyl group.

Specific examples of the silicone resin include resins described in JP-B No. 53-36515, JP-B No. 57-52371, JP-B No. 58-53656, and JP-B No. 61-17863.

The silicone resin is synthesized by causing the following to undergo dehydrogenation condensation reaction and dealcoholization reaction in the presence of an organic tin catalyst such as 2-ethylhexanetin: a silanol-both-terminated siloxane polymer, such as silanol-both-terminated polydimethylsiloxane, silanol-both-terminated polydiphenylsiloxane-dimethylsiloxane copolymer or silanol-both-terminated polydimethyldiphenylsiloxane; a trialkylalkoxysilane such as trimethylethoxysilane; a silane compound containing an ethylenically unsaturated bond, such as (3-acryloxypropyl) methyldimethoxysilane; and some other compound. The form of the silicone resin is preferably of a solvent-free type. In other words, in the case of using a solvent for the synthesis of the silicone resin, it is preferred to remove the solvent after the synthesis reaction.

About the charging formulation of the individual raw materials when the silicone resin is produced, the amount of the silane compound containing the ethylenically unsaturated bond, such as (3-acryloxypropyl)methoxysilane is preferably from 19 to 50% by mass of the total of the siloxane(s) and the silane compound(s) as the starting materials, more preferably from 25 to 40% by mass thereof. If the amount of the silane compound containing the ethylenically unsaturated bond is less than 19% by mass, the ethylenically unsaturated bond concentration in the finally-obtained resin tends to be far lower than a desired concentration. If the concentration is more than 50% by mass, the ethylenically unsaturated bond concentration in the resultant resin tends to be far higher than a desired concentration.

The acrylic resin can be obtained, for example, by copolymerizing a monomer for forming main-chain, such as an alkyl(meth)acrylate, an aryl(meth)acrylate, benzyl(meth) acrylate or styrene, with a monomer which contains a functional group for the introduction of an ethylenically unsaturated bond, such as (meth)acrylic acid, hydroxyethyl (meth)acrylate, isocyanatoethyl(meth)acrylate or glycidyl (meth)acrylate, to synthesize a prepolymer once; and next causing the prepolymer to undergo addition reaction with a monomer such as glycidyl(meth)acrylate, isocyanatoethyl (meth)acrylate, hydroxyethyl(meth)acrylate, (meth)acrylic or some other monomer in order to cause the monomer to react with the functional group of the prepolymer.

The polyester resin is not particularly limited, and may be a resin that can easily be produced by a known method.

The average molecular weight of (A) the resin having the ethylenically unsaturated bond is preferably in the range of 20,000 to 100,000, more preferably in the range of 30,000 to 80,000, the molecular weight being a weight-average molecular weight in terms of polystyrene and being obtained by gel permeation chromatography.

The ethylenically unsaturated bond concentration in the resin having the ethylenically unsaturated bond is preferably in the range of 0.3 to 0.5 mol/kg. If this concentration is less than 0.3 mol/kg, end regions of the light control film are not easily processed so that the transparent electrodes opposite to each other easily short-circuit therebetween. Thus, the light control film tends to give a poor electrical reliability. By contrast, if the concentration is more than 0.5 mol/kg, the cured polymeric medium is easily dissolved into the dispersing medium, which constitutes the droplets of the light control suspension, so as to give a tendency that the dissolved polymeric medium hinders the movement of the light control particles in the droplets so that the light control performance tends to decline.

The ethylenically unsaturated bond concentration in (A) the resin having the ethylenically unsaturated bond is obtained from the ratio between integrated-intensities of hydrogen according to NMR. When the conversion rate of the charged raw material into the resin is known, the concentration is also obtained by calculation.

(B) The photopolymerization initiator used in the polymeric medium may be a compound described in J. Photochem. Sci. Technol., 2, 283 (1977), specific examples thereof including 2,2-dimethoxy-1,2-diphenylethane-1-one, 1-(4-(2-hydroxyethoxy)phenyl)-2-hydroxy-2-methyl-1-propane-1-one, bis(2,4,6-trimethylbenzoyl)phenylphosphine oxide, 2-hydroxy-2-methyl-1-phenylpropane-1-one, and (1-hydroxycyclohexyl)phenyl ketone.

The use amount of (B) the photopolymerization initiator is preferably in the range of 0.1 to 20 parts by mass, more preferably in the range of 0.2 to 10 parts by mass relative to 100 parts by mass of (A) the resin.

Besides (A) the resin having the substituent having the ethylenically unsaturated bond, the following may be used as a constituting material of the polymeric medium: an organic solvent soluble resin or a thermoplastic resin, such as polyacrylic acid or polymethacrylic acid having a weight-average molecular weight in the range of 1,000 to 100,000, the molecular weight being a molecular weight in terms of polystyrene and being measured by gel permeation chromatography.

An additive, such as a coloration inhibitor such as dibutyltin dilaurate, may be added into the polymeric medium if necessary. The polymeric medium may contain a solvent. The solvent may be tetrahydrofuran, toluene, heptane, cyclohexane, ethyl acetate, ethanol, methanol, isoamyl acetate, hexyl acetate or the like.

It is preferred to use, as the dispersing medium of the light control suspension, a liquid copolymer which: fulfils a function of a dispersing medium in the light control suspension; adheres onto the light control particles selectively to cover the particles so that at the time of phase separation thereof from the polymeric medium, the dispersing medium acts to cause the particles to be shifted to the phase-separated droplet phase; and has neither electroconductivity nor affinity with the polymeric medium.

The liquid copolymer is preferably, for example, a (meth) acrylic acid ester oligomer having fluoro groups and/or hydroxyl groups, more preferably a (meth)acrylic acid ester oligomer having fluoro groups and hydroxyl groups. When such a liquid copolymer is used, the monomer units of either the fluoro groups or the hydroxyl groups are faced toward the light control particles. The monomer units of the other function to cause the light control suspension to be stably kept as droplets in the polymeric medium. Therefore, the light control particles are very homogeneously dispersed in the light control suspension, and at the time of the phase separation the light control particles are introduced into the phase-separated droplets.

The (meth)acrylic acid ester oligomer having fluoro groups and/or hydroxyl groups may be an oligomer obtained by using a fluoro-group-containing monomer and/or a hydroxyl-group-containing monomer, and carrying out copolymerization with the monomer(s). Specific examples thereof include 2,2,2-trifluoroethyl methacrylate/butyl acrylate/2-hydroxyethyl acrylate copolymer, 3,5,5-trimethylhexyl acrylate/2-hydroxypropyl acrylate/fumaric acid copolymer, butyl acrylate/2-hydroxyethyl acrylate copolymer, 2,2,3,3-tetrafluoropropyl acrylate/butyl acrylate/2-hydroxyethyl acrylate copolymer, 1H,1H,5H-octafluoropentyl acrylate/butyl acrylate/2-hydroxyethyl acrylate copolymer, 1H,1H,2H,2H-heptadecafluorodecyl acrylate/butyl acrylate/2-hydroxyethyl acrylate copolymer, 2,2,2-trifluoroethyl methacrylate/butyl acrylate/2-hydroxyethyl acrylate copolymer, 2,2,3,3-tetrafluoropropyl methacrylate/butyl acrylate/2-hydroxyethyl acrylate copolymer, 1H,1H,5H-octafluoropentyl methacrylate/butyl acrylate/2-hydroxyethyl acrylate copolymer, 1H,1H,2H,2H-heptadecafluorodecyl methacrylate/butyl acrylate/2-hydroxyethyl acrylate copolymer. The (meth)acrylic acid ester oligomers each preferably have both of fluoro groups and hydroxyl groups.

The weight-average molecular weight of these (meth)acrylic acid ester oligomers is preferably in the range of 1,000 to 20,000, more preferably in the range of 2,000 to 10,000, the molecular weight being a molecular weight in terms of standard polystyrene and being measured by gel permeation chromatography.

The use amount of the fluoro-group-containing monomer that is one of the starting materials of each of these (meth)acrylic acid ester oligomers is preferably in the range of 6 to 12% by mole of the total of monomers that are the starting materials, more effectively in the range of 7 to 8% by mole thereof. If the use amount of the fluoro-group-containing monomer is more than 12% by mole, the refractive index tends to become large so that the light transmittance falls. The use amount of the hydroxyl-group-containing monomer that is one of the starting materials of each of these (meth)acrylic acid ester oligomers is preferably in the range of 0.5 to 22.0 by mole, more preferably in the range of 1 to 8% by mole. If the use amount of the hydroxyl-group-containing monomer is more than 22.0 by mole, the refractive index tends to become large so that the light transmittance falls.

The light control suspension used in the present invention is a substance wherein light control particles are dispersed in the dispersing medium in the state that the particles can flow. As the light control particles, for example, the following are preferably used: needle-form small crystals of a polyiodide produced by causing iodine and a iodide to react with one material selected from the group consisting of pyrazine-2,3-dicarboxylic acid dihydrate, pyrazine-2,5-dicarboxylic acid dihydrate, and pyridine-2,5-dicarboxylic acid monohydrate, which are each a precursor of the light control particles, in the presence of a polymeric dispersing agent that is not affinitive with the polymeric medium or the resin component in the polymeric medium, that is, (A) the resin with the substituent having the ethylenically unsaturated bond, and that is further capable of making the dispersibility of the light control particles high. A usable example of the polymeric dispersing agent is nitrocellulose. The iodide may be calcium iodide or the like. Examples of the thus-obtained polyiodide include compounds represented by the following general formulae:

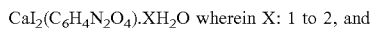

$CaI_2(C_6H_4N_2O_4).XH_2O$ wherein X: 1 to 2, and

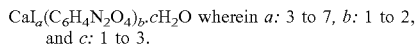

$CaI_a(C_6H_4N_2O_4)_b.cH_2O$ wherein a: 3 to 7, b: 1 to 2, and c: 1 to 3.

These polyiodides are each preferably a needle crystal.

For the light control particles for the light control film, for example, light control particles disclosed in the following may be used: U.S. Pat. No. 2,041,138 (E. H. Land); U.S. Pat. No. 2,306,108 (Land et al.); U.S. Pat. No. 2,375,963 (Thomas); U.S. Pat. No. 4,270,841 (R. L. Saxe); and GB Patent No 433,455. The polyiodide crystals known by these patents are each produced by selecting one from pyrazine carboxylic acids and pyridine carboxylic acids, and causing the selected acid to react with iodide, chlorine or bromine so as to be turned to a polyhalide such as polyiodide, polychloride or polybromide. The polyhalide is a complex compound obtained by causing a halogen atom to reacts with an inorganic or organic material. Details of the production process thereof are disclosed in, for example, U.S. Pat. No. 4,422,963 issued to Saxe.

In the step of synthesizing the light control particles, in order to make the light control particles into an even size and improve the dispersibility of the light control particles in the specified dispersing medium, it is preferred to use, as the polymeric dispersing agent, a polymeric material such as nitrocellulose, as disclosed by Saxe. However, when nitrocellulose is used, crystals covered with nitrocellulose are obtained. In the case of using such crystals as the light control particles, the light control particles may not float in the droplets separated at the time of the phase separation, so as to remain the resin matrix. In order to prevent this, it is preferred to use a silicone resin with a substituent having an ethylenically unsaturated bond as (A) the resin with the substituent having the ethylenically unsaturated bond in the polymeric medium. The use of the silicone resin makes it possible that the light control particles are easily dispersed and floated in fine droplets formed by the phase separation in the production of the film. As a result, a better variable ability can be obtained.

Besides the light control particles, use is made of, for example, an inorganic fiber such as carbon fiber, or a phthalocyanine compound such as τ type metal-free phthalocyanine or a metal phthalocyanine. Examples of the central metal in the phthalocyanine compound include copper, nickel, iron, cobalt, chromium, titanium, beryllium, molybdenum, tungsten, aluminum, and chromium.

In the present invention, the size of the light control particles is preferably 1 μm or less, more preferably in the range of 0.1 to 1 μm, even more preferably in the range of 0.1 to 0.5 μm. If the size of the light control particles is more than 1 μm, light is scattered thereon, the orientation movement of the particles is declined in the light control suspension when an electric field is applied thereto, and some other is caused, so that there is caused a problem that the transparency may be declined. The size of the light control particles is defined as the volume-average particle diameter measured with a submicron particle analyzer (N4MD, manufactured by Beckman Coulter, Inc.) according to photon correlation spectrometry.

The light control suspension used in the present invention is preferably composed of 1 to 70% by mass of the light control particles and 30 to 99% by mass of the dispersing medium, and is more preferably composed of 4 to 50% by mass of the light control particles and 50 to 96% by mass of the dispersing medium. In the present invention, the refractive index of the polymeric medium is preferably close to that of the dispersing medium. Specifically, the difference in refractive index between the polymeric medium and the dispersing medium in the present invention is preferably 0.005 or less, more preferably 0.003 or less. The light control material contains the light control suspension in an amount usually in the range of 1 to 100 parts by mass, preferably in the range of 6 to 70 parts by mass, more preferably in the range of 6 to 60 parts by mass relative to 100 parts by mass of the polymeric medium.

<Transparent Electroconductive Resin Substrates>

In general, the transparent electroconductive resin substrates used when the light control material according to the present invention is used to produce a light control film may each be a transparent electroconductive resin substrate having a light transmittance of 80% or more and having a surface resistance value of 3 to 3000Ω wherein a transparent resin substrate is coated with a transparent electroconductive film (an ITO, $SnO_2$, $In_2O_3$ or organic conductive film, or some other film). The light transmittance may be measured according to the method for measuring total light ray transmittance in JIS K7105. The transparent resin substrate may be, for example, a polymeric film.

The polymeric film is, for example, a film of a polyester such as polyethylene terephthalate, a film of a polyolefin such as polypropylene, polyvinyl chloride film, an acrylic resin film, a polyethersulfone film, a polyarylate film, a polycarbonate film, or some other resin film. A polyethylene terephthalate film is preferred since the film is excellent in transparency, formability, bondability, workability, and others.

The thickness of the transparent electroconductive film with which the transparent resin substrate is coated is preferably in the range of 10 to 5,000 nm. The thickness of the transparent resin substrate is not particularly limited. When the substrate is, for example, a polymeric film, the thickness is preferably in the range of 10 to 200 μm. In order to prevent a short-circuit phenomenon generated by a matter that the gap between the transparent resin substrates is narrow so that the incorporation of a contaminant and others are generated, it is allowable to use transparent electroconductive resin substrates in each of which a transparent insulating layer having a thickness in the range of several nanometers to about 1 μm is formed on a transparent electroconductive film. When the light control film of the present invention is used in a reflective-type light control window (in, for example, a rear viewing mirror for cars), a thin film of a electroconductive metal, such as aluminum, gold or silver, which is a reflecting body, may be used directly as an electrode.

<Light Control Film>

The light control film in the present invention can be formed, using a light control material, and the light control material includes a resin matrix made of a polymeric medium, and a light control suspension dispersed in the resin matrix to form a light control layer. The light control layer is sandwiched between two transparent electroconductive resin substrates each having a primer layer for improving the adhesiveness of the substrate onto the light control layer, or is sandwiched between two transparent electroconductive substrates one of which has a primer layer and the other of which has not any primer layer.

In order to obtain the light control film, a liquid light control suspension is first mixed with a polymeric medium into a homogeneous form to obtain a light control material made of a mixed liquid wherein the light control suspension is dispersed, in the state of droplets, in the polymeric medium.

Specifically, this process is as follows: A liquid wherein light control particles are dispersed in a solvent is mixed with a dispersing medium for light control suspension, and then the solvent is distilled off by means of a rotary evaporator or the like to prepare a light control suspension.

Next, the light control suspension and a polymeric medium are mixed with each other to prepare a mixed liquid (light control material) wherein the light control suspension is dispersed, in the state of droplets, in the polymeric medium.

This light control material is applied into a constant thickness onto a transparent electroconductive resin substrate having a primer layer, and optionally the solvent contained in the light control material is dried and removed. A high-pressure mercury lamp or the like is then used to radiate ultraviolet rays thereto, thereby curing the polymeric medium. As a result, a light control layer is formed wherein the light control suspension is dispersed, in the form of droplets, in a resin matrix made of the cured polymeric medium. By changing the blend ratio between the polymeric medium and the light control suspension variously, the light transmittance of the light control layer can be adjusted. Another transparent electroconductive resin substrate having a primer layer is caused to adhere closely to the thus formed light control layer, thereby obtaining a light control film.

Alternatively, it is allowable to apply this light control material into a constant thickness onto a transparent electroconductive resin substrate having a primer layer, optionally to dry and remove the solvent contained in the light control material, to laminate another transparent electroconductive resin substrate having a primer layer thereon, and then to irradiate the lamination with ultraviolet rays to cure the polymer medium. Only one of the transparent electroconductive resin substrates may be a transparent electroconductive resin substrate having a primer layer. It is also allowable to form light control layers onto two transparent electroconductive resin substrates, respectively, and then to laminate the substrates onto each other to cause the light control layers to adhere closely to each other. The thickness of the light control layer(s) is preferably in the range of 5 to 1,000 μm, more preferably in the range of 20 to 100 μm.

The size (average droplet diameter) of the droplets of the light control suspension dispersed in the resin matrix is usually in the range of 0.5 to 100 μm, preferably in the range of 0.5 to 20 μm, more preferably in the range of 1 to 5 μm. The size of the droplets is decided in accordance with the concentrations of the individual components that constitute the light control suspension, the viscosities of the light control suspension and the polymeric medium, the compatibility of the dispersing medium in the light control suspension with the polymeric medium, and others. The average droplet diameter can be calculated, for example, by using an SEM to take a photograph or some other image of the light control film along the direction toward one of its surfaces, measuring the diameters of arbitrarily-selected ones out of droplets therein, and then getting the average value thereof. The diameter can also be calculated by taking a viewing field image of the light control film through an optical microscope, as digital data, into a computer, and then applying an image processing integration software thereto.

The primer treatment (the formation of the primer layer) onto one or each of the transparent electroconductive resin substrates in the present invention can be conducted, for example, by applying the material for forming the primer layer onto the substrate, using a bar coater method, a Mayer bar coater method, an applicator method, a doctor blade method, a roll coater method, a die coater method, a comma coater method, a gravure coater method, a micro-gravure coater method, a roll brush method, a spray coating method, an air knife coating method, an impregnation method, a curtain coating method, and others alone or in combination. At the time of the applying, it is allowable to dilute the material for forming the primer layer optionally with an appropriate solvent, and then use the solution of the material for forming the primer layer. When the solvent is used, it is necessary to apply the solution onto the transparent electroconductive resin substrate and then to dry the resultant. The applied film, which is to be the primer layer, may be formed onto only a single surface of the transparent electroconductive resin substrate, or onto each of the substrate as the need arises.

The solvent used to form the primer layer may be any solvent as long as a solvent can dissolve the material for forming the primer layer, and can be removed by drying or the like after the formation of the primer layer. Examples thereof include isopropyl alcohol, ethanol, methanol, 1-methoxy-2-propanol, 2-methoxyethanol, cyclohexanone, methyl isobutyl ketone, anisole, methyl ethyl ketone, acetone, tetrahydrofuran, toluene, heptane, cyclohexane, ethyl acetate, propylene glycol monomethyl ether acetate, diethyl diglycol, dimethyl diglycol, isoamyl acetate, and hexyl acetate. A mixed solvent of two or more thereof may be used.

For the applying of the light control material, which is to be the light control layer, use is made of a known applying means, such as a bar coater, an applicator, a doctor blade, a roll coater, a die coater, or a comma coater. The light control material is applied onto the primer layer laid on each of the transparent electroconductive resin substrates. Alternatively, in the case of using transparent electroconductive resin substrates one of which has no primer layer, the light control material may be applied directly onto the transparent electroconductive resin substrate. At the time of the applying, the light control material may be diluted with an appropriate solvent as the need arises. When the solvent is used, it is necessary that after the diluted light control material is applied onto (each of) the transparent electroconductive resin substrate(s), the substrate is dried.

The solvent used for applying the light control material may be tetrahydrofuran, toluene, heptane, cyclohexane, ethyl acetate, ethanol, methanol, isoamyl acetate, hexyl acetate, or the like. In order to form a light control layer wherein the liquid light control suspension is dispersed, in the form of fine droplets, in the solid resin matrix, use may be made of a method of using a homogenizer, an ultrasonic homogenizer, or the like to mix components of the light control material with each other to disperse the light control suspension into the polymeric medium, a phase separation method based on the polymerization of the resin component(s) in the polymeric medium, a phase separation method based on the volatilization of the solvent contained in the light control material, or a phase separation method depending on temperature, or some other method.

According to the above-mentioned process, a light control film can be provided wherein the light transmittance can be adjusted arbitrarily by the formation of an electric field. Also when no electric field is formed, this light control film is kept in a vividly colored state, wherein no light is scattered. When an electric field is formed, the film is converted into a transparent state. This capability exhibits a property that 200000 or more reversible repetitions can be attained. In order to promote the light transmittance in the transparent state, and to promote the vividness in the colored state, it is preferred to make the refractive index of the liquid light control suspension equal to that of the resin matrix.

About the power source used to operate the light control film, an alternating current may be used, and the voltage thereof may be in the range of 10 to 100 volts (effective value), and the frequency thereof may be in the range of 30 Hz to 500 kHz.

About the light control film of the present invention, the response time to the electric field may be set into the range of 1 to 50 seconds when the film is discolored, and that may be set into the range of 1 to 100 seconds when the film is colored.

About the endurance against ultraviolet rays, results of an ultraviolet radiating test using ultraviolet rays of 750 W power and others, demonstrate that a stable variability is exhibited even after the lapse of 250 hours. Even when the film is allowed to stand still at −50 to 90° C. over a long period, the initial variability can be maintained.

When use is made of a method based on a water-used emulsion in the production of a light control film wherein a liquid crystal is used in the prior art, the liquid crystal reacts with water so that the light control property is lost in many cases. Thus, there is caused a problem that films having the same properties are not easily produced. In the present invention, use is made of not any liquid crystal but a liquid light control suspension wherein light control particles are dispersed; thus, when no electric field is applied, the light control film light does not cause light to be scattered and the film is in such a colored state that the vividness is excellent and no limitation is imposed onto the viewing angle, which is different from situations according to the liquid-crystal-used light control films. By adjusting the content by percentage of the light control particles, adjusting the droplet form or the film thickness, or adjusting the electric field intensity, the light variation degree can be adjusted arbitrarily. In the light control film of the present invention, no liquid crystal is used; therefore, the following are also overcome: a change in the color tone and a fall in the variability power that are based on the irradiation with ultraviolet rays; and a response time lag following a voltage drop generated between the periphery of the transparent electroconductive resin substrates and the center thereof, the lag being peculiar to large-sized products.

When no electric field is applied to the light control film according to the present invention, the film turns in a vividly colored state because of light absorption of the light control particles and dichroic effect on the basis of the Brownian movement of the light control particles in the light control suspension. However, when an electric field is applied thereto, the light control particles in the droplets or associated droplets are arranged in parallel to the electric field, so that the film is converted into a transparent state. Since the film of the present invention is in a film state, the film solves the problems of light control glass in the prior art, wherein a liquid light control suspension is used as it is, the problem being the following problems: the liquid suspension is not easily injected between two transparent electroconductive resin substrates; a difference in hydraulic pressure between the upper and lower regions of the product easily causes an expansion phenomenon of the lower region; and in accordance with the external environment, for example, the pressure of wind, the interval between the substrates is changed so that the color phase is locally changed; or a sealing member between the transparent electroconductive substrates is broken so that the light control material leaks.

In a case of a light control window according to the prior art wherein a liquid crystal is used, the liquid crystal is easily deteriorated by ultraviolet rays and further the range of the use temperature thereof is also narrow by thermal properties of a nematic liquid crystal. Furthermore, about optical properties thereof also, the following problems are caused: when no electric field is applied thereto, the window is turned in a milk-white semi-transparent state by light scattering; and when an electric field is applied thereto, the window is not completely turned vivid so that the opacified state remains. Accordingly, such a light control window cannot attain a display function based on the blocking and transmission of light, which are used as an action principle in existing liquid crystal display elements. However, the use of the light control film of the present invention makes it possible to solve such problems.

In the light control film of the present invention, the adhesiveness between the light control layer and the transparent electroconductive resin substrates is strong. Thus, the film is an excellent light control film which does not cause a problem that the light control layer is peeled from the transparent electroconductive resin substrates in the production steps, a working step after the production of the film, or some other step.

The light control film of the present invention can be preferably used for, e.g., an indoor or outdoor partition; a window glass plate or a skylight window for building; various flat display elements used in the electronic industry and for imaging instruments; alternate products for various gauge boards and existing liquid crystal display elements; a light shutter; various indoor and outdoor advertisement and guide indicating boards; window glass plates for an aircraft, a railway vehicles and a ship; window glass plates, a back mirror and a sun roof for a car; glasses; sunglasses; a sun visor; and other articles. The using manner of the light control film of the present invention may be a direct use of the film. In accordance with an article to which the present invention is applied, the light control film may be used in the state that the film is sandwiched between two substrates, or in the state that the film is adhered onto a single surface of a substrate. The substrate may be, for example, a glass plate, or a polymeric film equivalent to the above-mentioned transparent resin substrate.

The structure and the operation of the light control film according to the present invention will be described in more detail with reference to the drawings.

FIG. 1 is a schematic view of the structure of a light control film of an aspect of the present invention. A light control layer 1 is sandwiched between two transparent electroconductive resin substrates 4, which comprise two transparent resin substrates 5a and a transparent electroconductive film 5a, each of transparent resin substrate 5a being coated with a transparent electroconductive film 5a. A primer layer 6 is arranged between the light control layer 1 and each of the transparent electroconductive resin substrates 4. By switching a switch 8, a power source 7 is connected or disconnected to the two transparent electroconductive films 5a. The light control layer 1 is composed of a film-form resin matrix 2 obtained by curing (A) the resin with the substituent having the ethylenically unsaturated bond, with ultraviolet rays, and a liquid-form light control suspension dispersed, in the form of droplets 3, in the resin matrix 2.

Figure 2:
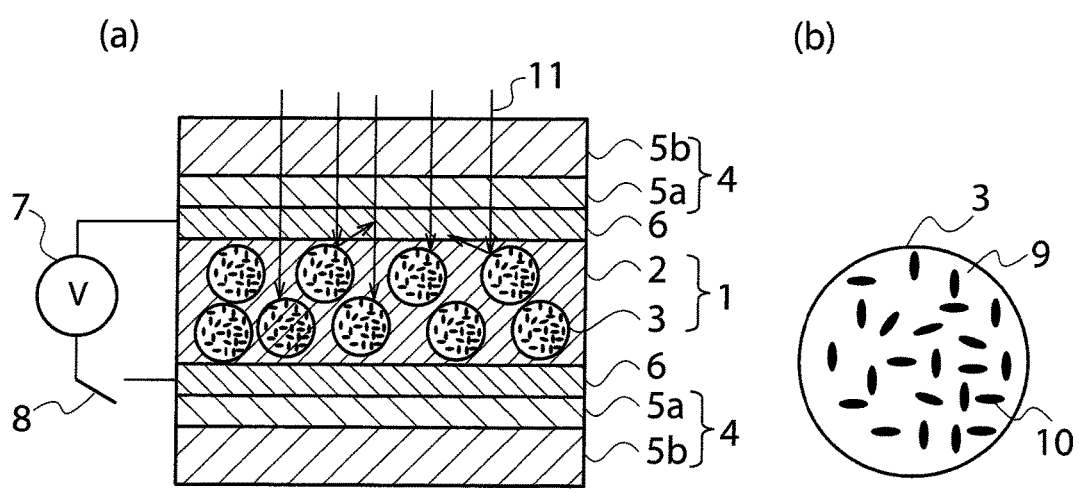
FIG. 2 are each a schematic view for describing the action of the light control film in FIG. 1 when no electric field is applied thereto.
Figure 3:
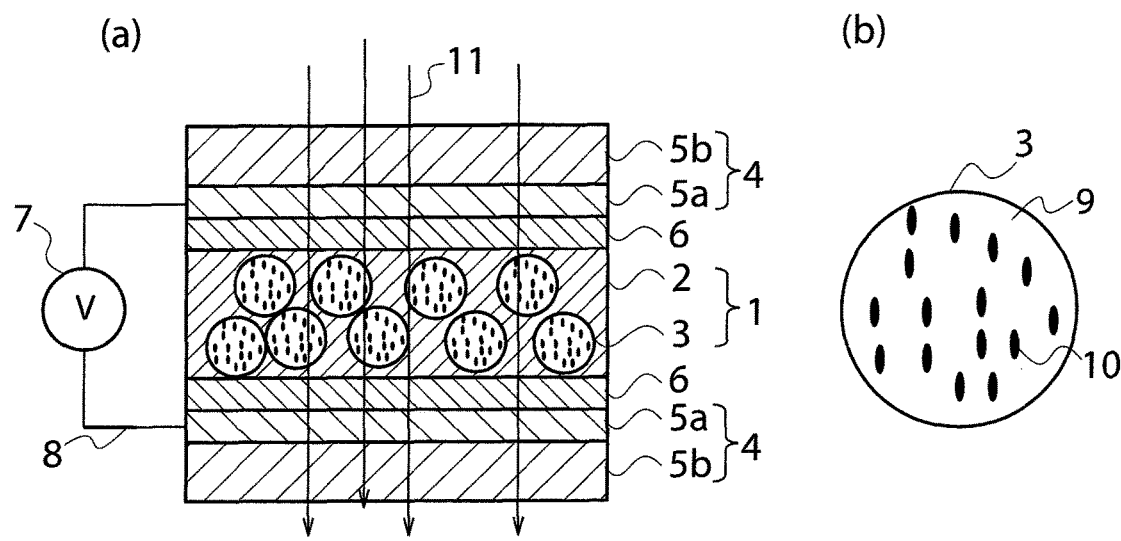
FIG. 3 are each a schematic view for describing the action of the light control film in FIG. 1 when an electric field is applied thereto.

FIG. 2 are each a schematic view for describing the operation of the light control film illustrated in FIG. 1, and each illustrate a case where the switch 8 is turned off to apply no electric field. In this case, incident rays 11 are absorbed, scattered or reflected in or on light control particles 10, which are dispersed in a dispersing medium 9 constituting the droplets 3 of the liquid-form light control suspension, by the Brownian movement of the light control particles 10. Thus, the rays 11 cannot be transmitted. As illustrated in FIG. 3, however, when the switch 8 is connected, so as to apply an electric field, the light control particles 10 are arranged in parallel to an electric field formed by the applied electric field so that the incident rays 11 come to pass between the arranged light control particles 10. In this way, a light transmitting function which causes neither scattering nor a fall in the transparency is produced.

EXAMPLES

The present invention will be more specifically described by way of examples and comparative examples of the present invention hereinafter. However, the present invention is not limited by these examples.

Production Example of Light Control Particles

In order to produce light control particles, in a 500 mL four-necked flask equipped with a stirrer and a condenser tube, 4.5 g of iodide (JIS extra pure reagent, manufactured by Wako Pure Chemical Industries, Ltd.) was dissolved in a solution composed of 87.54 g of a 15% by mass solution of nitrocellulose (trade name: 1/4 LIG, manufactured by Bergerac NC Co.), diluted with isoamyl acetate (extra pure reagent, manufactured by Wako Pure Chemical Industries, Ltd.), 44.96 g of isoamyl acetate, 4.5 g of dehydrated $CaI_2$ (for chemistry, manufactured by Wako Pure Chemical Industries, Ltd.), 2.0 g of anhydrous ethanol (for organic synthesis, manufactured by Wako Pure Chemical Industries, Ltd.), and purified water (purified water, manufactured by Wako Pure Chemical Industries, Ltd.). Thereto was then added 3 g of pyrazine-2,5-dicarboxylic acid dihydrate (manufactured by PolyCarbon Industries), which was a base-forming material of the light control particles. The resultant was stirred at 45° C. for 3 hours to terminate the reaction. Thereafter, the solid component was dispersed for 2 hours by means of an ultrasonic disperser. At this time, the color tone of the mixed liquid changed from brown to navy blue.

Next, in order to take out light control particles having specified sizes from the reaction solution, a centrifugal separator was used to separate the light control particles. The reaction solution was centrifuged at a rate of 750G for 10 minutes to remove the precipitation. Furthermore, the solution was centrifuged at a rate of 7390 G for 2 hours to remove the floated materials, and the precipitation particles were collected. The precipitation particles were made of a needle crystal having an average particle diameter of 0.36 μm, the diameter being measured by means of a submicron particle analyzer (N4MD, manufactured by Beckman Coulter, Inc.). The precipitation particles were called the light control particles.

Production Example of a Light Control Suspension

The light control particles obtained in the item (Production example of light control particles), the amount of which was 45.5 g, was added to 50 g of a copolymer of butyl acrylate (Wako extra pure reagent, manufactured by Wako Pure Chemical Industries, Ltd.)/2,2,2-trifluoroethyl methacrylate (for industry, manufactured by Kyoeisha Chemical Co., Ltd.)/2-hydroxyethyl acrylate (Wako first class reagent, manufactured by Wako Pure Chemical Industries, Ltd.) (ratio by mole between the monomers: 18/1.5/0.5, weight-average molecular weight: 2,000, refractive index: 1.4719), and then a stirrer was used to mix the components with each other for 30 minutes. Next, a rotary evaporator was used to remove isoamyl acetate at 80° C. in a vacuum having a reduced pressure of 133 Pa for 3 hours to produce a stable liquid-form light control suspension wherein the light control particles neither precipitated nor aggregated.

Production Example of an Energy Beam Curable Silicone Resin

Into a four-necked flask equipped with a Dean-Stark trap, a condenser tube, a stirrer and a heating device were charged 17.8 g of silanol-both-terminated polydimethylsiloxane (reagent, manufactured by Chisso Corp.), 62.2 g of silanol-both-terminated polydimethyldiphenylsiloxane (reagent, manufactured by Chisso Corp.), 20 g of (3-acryloxypropyl)methyldimethoxysilane (reagent, manufactured by Chisso Corp.), and 0.1 g of 2-ethylhexanetin (manufactured by Wako Pure Chemical Industries, Ltd.). In heptane, the solution was refluxed at 100° C. for 3 hours to conduct a reaction. Next, thereto was added 25 g of trimethylethoxysilane (reagent, manufactured by Chisso Corp.), and the resultant was refluxed for 2 hours to cause a dealcoholization reaction, and then a rotary evaporator was used to remove heptane in a vacuum having a reduced pressure of 100 Pa at 80° C. for 4 hours to obtain an energy beam curable silicone resin having a weight-average molecular weight of 35000, and a refractive index of 1.4745. From the hydrogen integrated-intensity ratio according to NMR, the concentration of ethylenically unsaturated bonds in this resin was 0.31 mol/kg. The ethylenically unsaturated bond concentration was measured by a method described below.

[Method for Measuring the Ethylenically Unsaturated Bond Concentration]

The ethylenically unsaturated bond concentration (mol/kg) was measured from the hydrogen integrated-intensity ratio according to NMR (using an integrated value of hydrogen in the ethylenically unsaturated bond near 6 ppm, an integrated value of hydrogen in phenyl groups near 7.5 ppm, and an integrated value of hydrogen in methyl groups near 0.1 ppm). The solvent for the measurement was rendered $CDCl_3$. In the resin produced as described above, the ratio by mass calculated out from the hydrogen integrated-intensity ratio according to NMR was as follows: the methyl groups/the phenyl groups/the ethylenically unsaturated groups was 11/6.4/1. The proportion of the ethylenically unsaturated groups in the whole was 5.4%, and the number of the ethylenically unsaturated groups per molecule was 9.35 from the individual molecular weights. Thus, the mole number per kilogram was calculated into 0.31 mol/kg.

Example 1

The light control suspension obtained in the item (Production example of a light control suspension), the amount of which was 2.5 g, was added to 10 g of the energy beam curable silicone resin obtained in the item (Production example of an energy beam curable silicone resin), 0.2 g of bis(2,4,6-trimethylbenzoyl)phenylphosphine oxide (Ciba Specialty Chemicals Inc.) as a photopolymerization initiator, and 0.3 g of dibutyltin dilaurate as a coloration inhibitor, and then the components were mechanically mixed with each other for 1 minute to produce a light control material.

Separately, an applicator method was used under a condition that the gap therein was set to 10 μm to apply a solution wherein a mixture of pentaerythritol triacrylate and pentaerythritol tetraacrylate (trade name: ARONIX M-305, manufactured by Toagosei Co., Ltd.) was dissolved in a mixed solvent of methyl ethyl ketone and cyclohexanone (the ratio therebetween=1:1) to give a concentration of 5.0% by mass, as a solution at the time of primer-layer-formation, onto a transparent electroconductive resin substrate made of a PET film (300R, manufactured by Toyobo Co., Ltd., thickness: 125 μm) which was coated with a transparent electroconductive film (thickness: 300 Å) made of ITO (indium tin oxide) and which had a surface electric resistance value of 200 to 700Ω in such a manner that the solution was applied onto the whole of the surface of the transparent electroconductive film. The workpiece was dried at 50° C. for 30 seconds, at 60° C. for 30 seconds, and 70° C. for 1 minute, and then irradiated with UV at 1000 mJ/cm² (from a metal halide lamp) to photocure the applied solution, thereby forming a primer layer. At this time, a photopolymerization initiator (1-hydroxy-cyclohexyl phenyl ketone) was added thereto in an amount of 3% by mass of the ARONIX M-305.

The thickness of the primer layer was 68 nm.

The light control material obtained as above was applied onto the whole of the surface of the transparent electroconductive resin substrate on which the primer layer was formed. Next, thereon was laminated the same transparent electroconductive resin substrate, on which a primer layer was formed in the same way, so as to face the primer layer onto the applied layer of the light control material. In this way, they were caused to adhere closely to each other. A metal halide lamp was used to radiate ultraviolet rays of 3000 mJ/cm² power onto the laminated transparent electroconductive resin substrates from the polyester film side thereof, so as to produce a light control film of 340 μm thickness wherein a film-form light control layer of 90 μm thickness, in which the light control suspension was dispersed and formed in a resin matrix cured with the ultraviolet rays so as to be in the form of spherical droplets, was sandwiched between the transparent electroconductive resin substrates.

Figure 4:
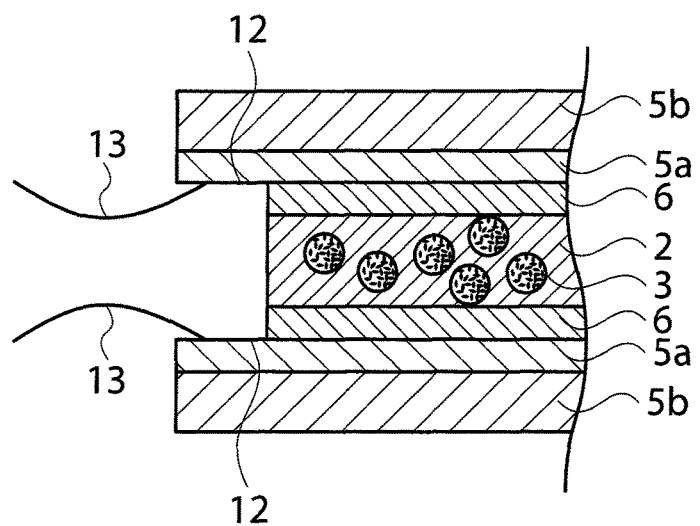
FIG. 4 is a schematic view for describing a state of an end region of the light control film. Illustration of light control particles 10 in droplets 3 is omitted.

Next, from an end region of this light control film, the light control layer was removed to make the transparent electroconductive film in the end region naked in order to attain electroconduction for voltage-application (see FIG. 4). The size (average droplet diameter) of the droplets of the light control suspension in the light control film was 3 μm on average. The light transmittance of the light control film was 1.1% when no alternating voltage was applied thereto (the electric-field-unapplied time). When an alternating voltage of 100 V (effective value) having a frequency of 50 Hz was applied thereto, the light transmittance of the light control film was 47%. The ratio between the light transmittance at the electric-field-applied time and that at the electric-field-unapplied time was as large as 47, and was good.

The end region of the light control film (the region where the light control layer was removed so that the transparent electroconductive film was made naked) was observed with the naked eye. As a result, curves of the transparent electroconductive resin substrates toward the center of the light control film in the thickness direction were very small (see FIG. 4). Measurements as described below were made for evaluations of the size of the droplets of the light control suspension in the light control film, the light transmittance of the light control film, the bonding strength between the light control layer and the transparent electroconductive resin substrates, the primer layer film thickness, the transferability of the primer layers, the tackiness, and the peeling mode.

The results are shown in Table 1.

[Method for Measuring the Size of the Droplets of the Light Control Suspension]

An SEM photograph of the light control film was taken along the direction toward one of the surfaces of the light control film. The diameters of arbitrarily-selected ones out of the droplets therein were measured, and the average value thereof was calculated.

[Method for Measuring the Light Transmittance of the Light Control Film]

A spectroscopic color-difference meter SZ-Σ90 (manufactured by Nippon Denshoku Industries Co., Ltd.) was used to measure the Y value (%) in the state that the used light source was an A light source and the viewing angle was set to 2 degrees. The Y value was defined as the light transmittance. The light transmittance was measured at the electric-field-applied time and at the electric-field-unapplied time.

[Method for Measuring the Bonding Strength of the Light Control Layer]

The bonding strength was measured, using a rheometer, STROGRAPH E-S (manufactured by Toyo Seiki Seisaku-sho Ltd.) to peel one of the transparent electroconductive resin substrates from the light control layer of the light control film under the following conditions: the peeling angle was 90°, the loading weight was 50 N, and the pulling-up speed was 50 mm/min

[Method for Measuring the Film Thickness of the Primer Layers]

The film thickness of the primer layers was measured by use of an instantaneous spectrophotometer F-20 (manufactured by Filmetrics Japan, Inc.).

[Method for Evaluating the Transferability]

Any one of the primer layers was put onto a PET surface of an ITO/PET product, and then a weight of about 1 kg was put on the resultant matter. In this state, the matter was stored for one week, and it was checked with the naked eye whether or not the primer layer was transferred on the PET surface of the ITO/PET product. A case where the proportion of the transferred area was 5% or less of the whole of the primer-applied area was evaluated as ○; a case where the proportion of the transferred area was from 5 to 30% of the whole of the primer-applied area, Δ; and a case where the proportion was 30% or more, x.

[Method for Evaluating the Tackiness]

The tackiness of the primer-layer-formed ITO/PET (any one of the primer-layer-formed transparent electroconductive resin substrates produced in Example 1 before the light control layer was formed) was evaluated as follows:

First, a light control material was applied onto the primer-layer-formed ITO/PET (any one of the primer-layer-formed transparent electroconductive resin substrates produced in Example 1 before the light control layer was formed).

When the light control film was produced in a roll-to-roll manner, the other primer-layer-formed ITO/PET (the other primer-layer-formed transparent electroconductive resin substrate produced in Example 1 before the light control layer was formed) was laminated onto the above-mentioned substrate, on which the light control material had already been formed. At this time, it was necessary to adjust the position of the other primer-layer-formed ITO/PET delicately into a direction perpendicular to the applying direction, so as to put the two onto each other precisely. A case where the position adjustment was able to be easily attained in the state that the primer layer of the other primer-layer-formed ITO/PET contacted a tension-applying metallic roll was evaluated as ○; a case where the adjustment was not easily attained but was allowable, Δ; and a case where the position adjustment was difficult, x.

[Method for Evaluating the Peeling Mode]

About the light control film from which the transparent electroconductive resin substrates were peeled, the film being obtained after the measurement of the bonding strength, the manner that the transparent electroconductive resin substrates were peeled from the light control film, was evaluated in accordance with an evaluation criterion decided as described below. A case where the light control layer remained on each of the two transparent electroconductive resin substrates, and at the time of the peeling, the inside of the light control layer was broken was defined as cohesive failure. A case where the light control layer remained on only one of the transparent electroconductive resin substrates, and at the time of the peeling, the light control layer itself was not broken (only the substrates were peeled) was defined as interfacial peeling.

Example 2

A light control film was produced and then the various measurements were measured thereabout in the same way as in Example 1 except that: a micro-gravure method (mesh #: 150) was used to apply, as the solution at the time of the primer-layer-formation, a solution wherein a product AY42-150 (trade name) manufactured by Dow Corning Toray Co., Ltd. was dissolved in a mixed solvent of isopropyl alcohol and 1-methoxy-2-propanol (ratio therebetween=1:1) to give a concentration of 1.0% by mass onto the whole of the surface of the transparent electroconductive film of each of the transparent electroconductive resin substrates; and the workpiece was dried at 50° C. for 30 seconds, at 60° C. for 30 seconds, and 70° C. for 1 minute, and then irradiated with UV at 1000 mJ/cm$^2$ (a metal halide lamp), so as to photocure the applied solution, thereby forming each primer layer. The results are shown in Table 1. The product AY42-150 contains a photopolymerization (1-hydroxy-cyclohexyl phenyl ketone). The thickness of the primer was 68 nm.

The product AY42-150, which was used to form the primer layer, is a mixture that contains $SiO_2$ fine particles and is composed of a dipentaerythritol acrylate, a methacrylic acid monomer, and a siloxane compound.

Example 3

A light control film was produced and then the various measurements were measured thereabout in the same way as in Example 1 except that: an applicator method was used under a condition that the gap therein was set to 10 vim to apply, as the solution at the time of the primer-layer-formation, a solution wherein an acrylic acid adduct of glycerin diglycidyl ether (trade name: EPOXY ESTER 80MFA, manufactured by Kyoeisha Chemical Co., Ltd.) was dissolved in a mixed solvent of methyl ethyl ketone and cyclohexanone (ratio therebetween=1:1) to give a concentration of 5.0% by mass onto the whole of the surface of the transparent electroconductive film of each of the transparent electroconductive resin substrates; and the workpiece was dried at 50° C. for 30 seconds, at 60° C. for 30 seconds, and 70° C. for 1 minute, and then irradiated with UV at 1000 mJ/cm$^2$ (a metal halide lamp), so as to photocure the applied solution, thereby forming each primer layer. The results are shown in Table 1. At this time, a photopolymerization initiator (1-hydroxy-cyclohexyl phenyl ketone) was added thereto in an amount of 3% by mass of the product EPOXY ESTER 80MFA.

The thickness of the primer layer was 95 nm.

Example 4

A light control film was produced and then the various measurements were measured thereabout in the same way as in Example 1 except that: a micro-gravure method (mesh #: 150) was used to apply, as the solution at the time of the primer-layer-formation, a solution wherein a product UVHC 7000 (trade name) manufactured by Momentive Performance Materials Japan LLC was dissolved in isopropyl alcohol to give a concentration of 1.0% by mass onto the whole of the surface of the transparent electroconductive film of each of the transparent electroconductive resin substrates; and the workpiece was dried at 50° C. for 30 seconds, at 60° C. for 30 seconds, and 70° C. for 1 minute, and then irradiated with UV at 500 mJ/cm$^2$ (a mercury lamp), so as to photocure the applied solution, thereby forming each primer layer. The results are shown in Table 1. The product UVHC 7000 contains a photopolymerization (1-hydroxy-cyclohexyl phenyl ketone) in an amount of 3.5% by mass of the product UVHC 7000.

The thickness of the primer was 35 nm.

The product UVHC 7000, which was used to form the primer layer, contains no filler but contains an IPDI-skeleton-containing pentaerythritol urethane acrylate, tripropylene glycol diacrylate, and 1,6-hexanediol diacrylate.

ARONIX M-405, manufactured by Toagosei Co., Ltd.) was dissolved in a mixed solvent of methyl ethyl ketone and cyclohexanone (ratio therebetween=1:1) to give a concentration of 5.0% by mass onto the whole of the surface of the transparent electroconductive film of each of the transparent electroconductive resin substrates; and the workpiece was dried at 50° C. for 30 seconds, at 60° C. for 30 seconds, and 70° C. for 1 minute, and then irradiated with UV at 1000 mJ/cm$^2$ (a metal halide lamp), so as to photocure the applied solution, thereby forming each primer layer. The results are shown in Table 2. At this time, a photopolymerization initiator (1-hydroxy-cyclohexyl phenyl ketone) was added thereto in an amount of 3% by mass of the product ARONIX M-405.

The thickness of the primer layer was 77 nm.

Comparative Example 3

A light control film was produced and then the various measurements were measured thereabout in the same way as in Example 1 except that: an applicator method was used under a condition that the gap was set to 10 μm to apply, as the solution at the time of the primer-layer-formation, a solution wherein isocyanuric-acid-EO modified triacrylate (trade name: ARONIX M-315, manufactured by Toagosei Co., Ltd.) was dissolved in a mixed solvent of methyl ethyl ketone and cyclohexanone (ratio therebetween=1:1) to give a concentration of 5.0% by mass onto the whole of the surface of the transparent electroconductive film of each of the transparent electroconductive resin substrates; and the workpiece was dried at 50° C. for 30 seconds, at 60° C. for

TABLE 1

| Items | Material of primer layer (% by mass) | Film thickness (nm) | Light transmittance when electric field applied (%) | Light transmittance when electric field unapplied (%) | Bonding strength (N/m) | Tackiness | Ttansferability | Peeling mode |
|---|---|---|---|---|---|---|---|---|
| Example 1 | M-305 (5.0) | 68 | 47 | 1.1 | 14.3 | ○ | ○ | Cohesive failure |
| Example 2 | AY42-150 (1.0) | 68 | 48 | 0.8 | 12.2 | ○ | ○ | Cohesive failure |
| Example 3 | Epoxy ester 80MFA (5.0) | 95 | 46 | 1.1 | 14.8 | ○ | ○ | Cohesive failure |
| Example 4 | UVHC7000 (1.0) | 35 | 46 | 1.0 | 13.2 | ○ | ○ | Cohesive failure |

Comparative Example 1

A light control film was produced and then the various measurements were measured thereabout in the same way as in Example 1 except that PET films (300R, manufactured by Toyobo Co., Ltd., thickness: 125 μm) which were each coated with a transparent electroconductive film made of ITO were used, as they were, without forming any primer layer onto each of the films. The results are shown in Table 2.

Comparative Example 2

A light control film was produced and then the various measurements were measured thereabout in the same way as in Example 1 except that: an applicator method was used under a condition that the gap was set to 10 μm to apply, as the solution at the time of the primer-layer-formation, a solution wherein dipentaerythritol hexaacrylate (trade name:

30 seconds, and 70° C. for 1 minute, and then irradiated with UV at 1000 mJ/cm$^2$ (a metal halide lamp), so as to photocure the applied solution, thereby forming each primer layer. The results are shown in Table 2. At this time, a photopolymerization initiator (1-hydroxy-cyclohexyl phenyl ketone) was added thereto in an amount of 3% by mass of the product ARONIX M-315.

The thickness of the primer layer was 82 nm.

Comparative Example 4

A light control film was produced and then the various measurements were measured thereabout in the same way as in Example 1 except that: an applicator method was used under a condition that the gap was set to 10 μm to apply, as the solution at the time of the primer-layer-formation, a solution wherein acrylic acid dimer (trade name: ARONIX M-5600, manufactured by Toagosei Co., Ltd.) was dissolved in a mixed solvent of methyl ethyl ketone and cyclohexanone (ratio therebetween=1:1) to give a concentration of 5.0% by mass onto the whole of the surface of the transparent electroconductive film of each of the transparent electroconductive resin substrates; and the workpiece was dried at 50° C. for 30 seconds, at 60° C. for 30 seconds, and 70° C. for 1 minute, and then irradiated with UV at 1000 mJ/cm$^2$ (a metal halide lamp), so as to photocure the applied solution, thereby forming each primer layer. The results are shown in Table 2. At this time, a photopolymerization initiator (1-hydroxy-cyclohexyl phenyl ketone) was added thereto in an amount of 3% by mass of the product ARONIX M-5600.

The thickness of the primer layer was 48 nm.

Comparative Example 5

A light control film was produced and then the various measurements were measured thereabout in the same way as in Example 1 except that: an applicator method was used under a condition that the gap was set to 10 μm to apply, as the solution at the time of the primer-layer-formation, a solution wherein monohydroxyethyl phthalate acrylate (trade name: ARONIX M-5400, manufactured by Toagosei Co., Ltd.) was dissolved in a mixed solvent of methyl ethyl ketone and cyclohexanone (ratio therebetween=1:1) to give a concentration of 5.0% by mass onto the whole of the surface of the transparent electroconductive film of each of the transparent electroconductive resin substrates; and the workpiece was dried at 50° C. for 30 seconds, at 60° C. for 30 seconds, and 70° C. for 1 minute, and then irradiated with UV at 1000 mJ/cm$^2$ (a metal halide lamp), so as to photocure the applied solution, thereby forming each primer layer. The results are shown in Table 2. At this time, a photopolymerization initiator (1-hydroxy-cyclohexyl phenyl ketone) was added thereto in an amount of 3% by mass of the product ARONIX M-5400.

The thickness of the primer layer was 56 nm

Comparative Example 6

A light control film was produced and then the various measurements were measured thereabout in the same way as in Example 1 except that: an applicator method was used under a condition that the gap was set to 10 μm to apply, as the solution at the time of the primer-layer-formation, a solution wherein ω-carboxy-polycaprolactone monoacrylate (trade name: ARONIX M-5300, manufactured by Toagosei Co., Ltd.) was dissolved in a mixed solvent of methyl ethyl ketone and cyclohexanone (ratio therebetween=1:1) to give a concentration of 5.0% by mass onto the whole of the surface of the transparent electroconductive film of each of the transparent electroconductive resin substrates; and the workpiece was dried at 50° C. for 30 seconds, at 60° C. for 30 seconds, and 70° C. for 1 minute, and then irradiated with UV at 1000 mJ/cm$^2$ (a metal halide lamp), so as to photocure the applied solution, thereby forming each primer layer. The results are shown in Table 2. At this time, a photopolymerization initiator (1-hydroxy-cyclohexyl phenyl ketone) was added thereto in an amount of 3% by mass of the product ARONIX M-5300.

The thickness of the primer layer was 72 nm

Comparative Example 7

A light control film was produced and then the various measurements were measured thereabout in the same way as in Example 1 except that: an applicator method was used under a condition that the gap was set to 10 μm to apply, as the solution at the time of the primer-layer-formation, a solution wherein 1,6-hexanediol diacrylate (trade name: LIGHT ACRYLATE 1,6HX-A, manufactured by Kyoeisha Chemical Co., Ltd.) was dissolved in a mixed solvent of methyl ethyl ketone and cyclohexanone (ratio therebetween=1:1) to give a concentration of 5.0% by mass onto the whole of the surface of the transparent electroconductive film of each of the transparent electroconductive resin substrates; and the workpiece was dried at 50° C. for 30 seconds, at 60° C. for 30 seconds, and 70° C. for 1 minute, and then irradiated with UV at 1000 mJ/cm$^2$ (a metal halide lamp), so as to photocure the applied solution, thereby forming each primer layer. The results are shown in Table 2. At this time, a photopolymerization initiator (1-hydroxy-cyclohexyl phenyl ketone) was added thereto in an amount of 3% by mass of the product LIGHT ACRYLATE 1,6HX-A.

The thickness of the primer layer was 55 nm

Comparative Example 8

A light control film was produced and then the various measurements were measured thereabout in the same way as in Example 1 except that: an applicator method was used under a condition that the gap was set to 10 μm to apply, as the solution at the time of the primer-layer-formation, a solution wherein dimethylol-tricyclodecane diacrylate (trade name: LIGHT ACRYLATE DCP-A, manufactured by Kyoeisha Chemical Co., Ltd.) was dissolved in a mixed solvent of methyl ethyl ketone and cyclohexanone (ratio therebetween=1:1) to give a concentration of 5.0% by mass onto the whole of the surface of the transparent electroconductive film of each of the transparent electroconductive resin substrates; and the workpiece was dried at 50° C. for 30 seconds, at 60° C. for 30 seconds, and 70° C. for 1 minute, and then irradiated with UV at 1000 mJ/cm$^2$ (a metal halide lamp), so as to photocure the applied solution, thereby forming each primer layer. The results are shown in Table 2. At this time, a photopolymerization initiator (1-hydroxy-cyclohexyl phenyl ketone) was added thereto in an amount of 3% by mass of the product LIGHT ACRYLATE DCP-A.

The thickness of the primer layer was 45 nm.

TABLE 2

| Items | Material of primer layer (% by mass) | Film thickness (nm) | Light transmittance when electric field applied (%) | Light transmittance when electric field unapplied (%) | Bonding strrength (N/m) | Tackiness | Ttansferability | Peeling mode |
|---|---|---|---|---|---|---|---|---|
| Comparative Example 1 | No primer | — | 46 | 1.1 | 0.5 | ○ | ○ | Interfacial peeling |
| Comparative Example 2 | M-405 (5.0) | 77 | 47 | 0.9 | 4.9 | ○ | ○ | Interfacial peeling |

TABLE 2-continued

| Items | Material of primer layer (% by mass) | Film thickness (nm) | Light transmittance when electric field applied (%) | Light transmittance when electric field unapplied (%) | Bonding strrength (N/m) | Tackiness | Ttansferability | Peeling mode |
|---|---|---|---|---|---|---|---|---|
| Comparative Example 3 | M-315 (5.0) | 82 | 47 | 1.1 | 2.1 | X | X | Interfacial peeling |
| Comparative Example 4 | M-5600 (5.0) | 48 | 45 | 0.9 | 3.1 | Δ | X | Interfacial peeling |
| Comparative Example 5 | M-5400 (5.0) | 56 | 47 | 1.0 | 1.5 | Δ | Δ | Interfacial peeling |
| Comparative Example 6 | M-5300 (5.0) | 72 | 48 | 1.1 | 5.1 | Δ | X | Interfacial peeling |
| Comparative Example 7 | 1,6HX-A (5.0) | 55 | 47 | 0.9 | 2.2 | X | Δ | Interfacial peeling |
| Comparative Example 8 | DCP-A (5.0) | 45 | 46 | 1.0 | 1.6 | X | X | Interfacial peeling |

As shown in Tables 1 and 2, about the light transmittances at the electric-field-applied time and at the electric-field-unapplied time, a difference was hardly generated between Comparative Example 1 and each of the Examples. However, in Comparative Example 1, wherein no primer was formed, and Comparative Examples 2 to 8, each of which primer layers other than the primer layers in the present invention were formed, the bonding strength was remarkably small, and further a peel of the light control layer from the transparent electroconductive resin substrates or either one thereof was generated at the interface between the light control layer and the substrate(s).

By contrast, in each of the Examples, by the use of the primer layers, which were each made of a material containing a (meth)acrylate having in the molecule thereof a hydroxyl group, the bonding strength was largely improved and a peel was generated in a cohesive failure mode. Thus, the adhesiveness was able to be largely improved while the light control property was kept.

DESCRIPTION OF REFERENCE NUMERALS

1 Light control layer
2 Resin matrix
3 Droplet
4 Transparent electroconductive resin substrate
5a Transparent electroconductive film
5b Transparent resin substrate
6 Primer layer
7 Power source
8 Switch
9 Dispersing medium
10 Light control particle
11 Incident light ray
12 Transparent electroconductive film surface made naked by removing a light control layer
13 Lead through which a voltage is applied to transparent electroconductive film

The invention claimed is:

1. A light control film, comprising: two transparent electroconductive resin substrates; and a light control layer sandwiched between the two transparent electroconductive resin substrates, the light control layer comprising: a resin matrix; and a light control suspension dispersed in the resin matrix, wherein at least one of the transparent electroconductive resin substrates has, on the light control layer side thereof, a primer layer, and the primer layer is made of a film comprising a material containing a (meth)acrylate having, in the molecule thereof, a hydroxyl group.

2. The light control film according to claim 1, wherein the hydroxyl group is an alcoholic hydroxyl group.

3. The light control film according to claim 2, wherein the primer layer contains oxide fine particles.

4. The light control film according to claim 3, wherein the oxide fine particles are any one of $SiO_2$, ITO and $ZrO_2$, or a mixture thereof.

5. The light control film according to claim 4, wherein the (meth)acrylate in the film of which the primer layer is made is thermally cured or optically cured.

6. The light control film according to claim 3, wherein the (meth)acrylate in the film of which the primer layer is made is thermally cured or optically cured.

7. The light control film according to claim 2, wherein the (meth)acrylate in the film of which the primer layer is made is thermally cured or optically cured.

8. The light control film according to claim 1, wherein the (meth)acrylate having in the molecule thereof a hydroxyl group, is a (meth)acrylate having a pentaerythritol skeleton.

9. The light control film according to claim 8, wherein the primer layer contains oxide fine particles.

10. The light control film according to claim 9, wherein the oxide fine particles are any one of $SiO_2$, ITO and $ZrO_2$, or a mixture thereof.

11. The light control film according to claim 8, wherein the (meth)acrylate in the film of which the primer layer is made is thermally cured or optically cured.

12. The light control film according to claim 8, wherein the (meth)acrylate in the film of which the primer layer is made is thermally cured or optically cured.

13. The light control film according to claim 1, wherein the primer layer contains oxide fine particles.

14. The light control film according to claim 13, wherein the oxide fine particles are any one of $SiO_2$, ITO and $ZrO_2$, or a mixture thereof.

15. The light control film according to claim 14, wherein the (meth)acrylate in the film of which the primer layer is made is thermally cured or optically cured.

16. The light control film according to claim 15, wherein the film thickness of the primer layer is 500 nm or less.

17. The light control film according to claim 14, wherein the film thickness of the primer layer is 500 nm or less.

18. The light control film according to claim 13, wherein the (meth)acrylate in the film of which the primer layer is made is thermally cured or optically cured.

19. The light control film according to claim 1, wherein the film thickness of the primer layer is 500 nm or less.

20. The light control film according to claim 1, wherein the (meth)acrylate in the film of which the primer layer is made is thermally cured or optically cured.

21. The light control film according to claim 1, wherein the resin matrix contains (A) a resin with a substituent having an ethylenically unsaturated bond.

22. The light control film according to claim 1, wherein the at least one transparent electroconductive resin substrate having the primer layer comprises a transparent resin substrate and a transparent electroconductive film, the transparent electroconductive film being at least one selected from the group consisting of an ITO film, a $SnO_2$ film, an $In_2O_3$ film and an organic conductive film.

23. The light control film according to claim 1, wherein the resin matrix contains (A) a resin with a substituent having an ethylenically unsaturated bond and, the at least one transparent electroconductive resin substrate having the primer layer comprises a transparent resin substrate and a transparent electroconductive film, the transparent electroconductive film being at least one selected from the group consisting of an ITO film, a $SnO_2$ film, an $In_2O_3$ film and an organic conductive film.

* * * * *